US012755281B2

(12) United States Patent
Rule et al.

(10) Patent No.: US 12,755,281 B2
(45) Date of Patent: Oct. 6, 2026

(54) AUTOFILLING DATA BASED ON ACCOUNT AUTHENTICATION USING A CONTACTLESS CARD

(71) Applicant: Capital One Services, LLC, McLean, VA (US)

(72) Inventors: Jeffrey Rule, Chevy Chase, MD (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 40 days.

(21) Appl. No.: 17/530,837

(22) Filed: Nov. 19, 2021

(65) Prior Publication Data

US 2023/0162187 A1 May 25, 2023

(51) Int. Cl.
*G06Q 40/00* (2023.01)
*G06F 9/445* (2018.01)
(Continued)

(52) U.S. Cl.
CPC ........... *G06Q 20/401* (2013.01); *G06F 9/445* (2013.01); *G06F 40/174* (2020.01); *G06Q 20/352* (2013.01); *H04L 9/3234* (2013.01)

(58) Field of Classification Search
USPC ........................................................... 705/44
See application file for complete search history.

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 A1 7/2017
CN 101192295 A 6/2008
(Continued)

OTHER PUBLICATIONS

Hazarika et al., "Recommendations for Webview Based Mobile Applications on Android," 2014 IEEE International Conference on Advanced Communication Control and Computing Technologies, 4 pages.

(Continued)

*Primary Examiner* — Olabode Akintola
(74) *Attorney, Agent, or Firm* — KDW FIRM PLLC

(57) ABSTRACT

Techniques to autofill data. A web browser may detect a payment field in a web page and determine that an application associated with a contactless card is installed on a device. The browser may generate a uniform resource identifier (URI) directed to the application. The URI may include a merchant identifier, a session identifier, and an action identifier as parameters. A mobile operating system may launch the application based on the URI. The application may authenticate, based on the action identifier parameter of the URI, an account associated with the contactless card based on a cryptogram generated by the contactless card. The application may receive, based on the authentication, payment information associated with the contactless card. A WebView component of the application may access the web page and autofill the payment information into the payment field. The WebView component may then process a transaction based on the autofilled payment information.

20 Claims, 18 Drawing Sheets

100

100

(51) Int. Cl.

| | |
|---|---|
| ***G06F 40/174*** | (2020.01) |
| ***G06Q 20/34*** | (2012.01) |
| ***G06Q 20/40*** | (2012.01) |
| ***H04L 9/32*** | (2006.01) |

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,276,814 | B1 | 10/2012 | Davis |
| 8,285,329 | B1 | 10/2012 | Zhu |

(56) References Cited

U.S. PATENT DOCUMENTS

| | | | |
|---|---|---|---|
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,346,670 | B2 | 1/2013 | Hasson |
| 8,365,988 | B1 | 2/2013 | Medina, III et al. |
| 8,369,960 | B2 | 2/2013 | Tran et al. |
| 8,371,501 | B1 | 2/2013 | Hopkins |
| 8,381,307 | B2 | 2/2013 | Cimino |
| 8,391,719 | B2 | 3/2013 | Alameh et al. |
| 8,417,231 | B2 | 4/2013 | Sanding et al. |
| 8,439,271 | B2 | 5/2013 | Smets et al. |
| 8,475,367 | B1 | 7/2013 | Yuen et al. |
| 8,489,112 | B2 | 7/2013 | Roeding et al. |
| 8,511,542 | B2 | 8/2013 | Pan |
| 8,511,547 | B2 | 8/2013 | Rans |
| 8,519,822 | B2 | 8/2013 | Riegebauer |
| 8,559,872 | B2 | 10/2013 | Butler |
| 8,566,916 | B1 | 10/2013 | Bailey et al. |
| 8,567,670 | B2 | 10/2013 | Stanfield et al. |
| 8,572,386 | B2 | 10/2013 | Takekawa et al. |
| 8,577,810 | B1 | 11/2013 | Dalit et al. |
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | de Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Marshall Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,038,688 | B1 * | 6/2021 | Mossler ............... G06Q 20/356 |

(56) References Cited

U.S. PATENT DOCUMENTS 11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
12,159,275 B1 * 12/2024 Ho ........................ G06Q 20/40
2001/0010723 A1 8/2001 Pinkas
2001/0029485 A1 10/2001 Brody et al.
2001/0034702 A1 10/2001 Mockett et al.
2001/0054003 A1 12/2001 Chien et al.
2002/0078345 A1 6/2002 Sandhu et al.
2002/0093530 A1 7/2002 Krothapalli et al.
2002/0100808 A1 8/2002 Norwood et al.
2002/0120583 A1 8/2002 Keresman, III et al.
2002/0152116 A1 10/2002 Yan et al.
2002/0153424 A1 10/2002 Li
2002/0165827 A1 11/2002 Gien et al.
2003/0023554 A1 1/2003 Yap et al.
2003/0034873 A1 2/2003 Chase et al.
2003/0055727 A1 3/2003 Walker et al.
2003/0078882 A1 4/2003 Sukeda et al.
2003/0167350 A1 9/2003 Davis et al.
2003/0208449 A1 11/2003 Diao
2003/0220876 A1 11/2003 Burger
2004/0015958 A1 1/2004 Veil et al.
2004/0039919 A1 2/2004 Takayama et al.
2004/0127256 A1 7/2004 Goldthwaite et al.
2004/0215674 A1 10/2004 Odinak et al.
2004/0230799 A1 11/2004 Davis
2005/0044367 A1 2/2005 Gasparini et al.
2005/0075985 A1 4/2005 Cartmell
2005/0081038 A1 4/2005 Arditti Modiano et al.
2005/0138387 A1 6/2005 Lam et al.
2005/0156026 A1 7/2005 Ghosh et al.
2005/0160049 A1 7/2005 Lundholm
2005/0195975 A1 9/2005 Kawakita
2005/0228997 A1 10/2005 Bicker
2005/0247797 A1 11/2005 Ramachandran
2005/0269402 A1 12/2005 Spitzer
2006/0006230 A1 1/2006 Bear et al.
2006/0040726 A1 2/2006 Szrek et al.
2006/0041402 A1 2/2006 Baker
2006/0044153 A1 3/2006 Dawidowsky
2006/0047954 A1 3/2006 Sachdeva et al.
2006/0085848 A1 4/2006 Aissi et al.
2006/0136334 A1 6/2006 Atkinson et al.
2006/0173985 A1 8/2006 Moore
2006/0174331 A1 8/2006 Schuetz
2006/0242698 A1 10/2006 Inskeep et al.
2006/0280338 A1 12/2006 Rabb
2007/0033642 A1 2/2007 Ganesan et al.
2007/0055630 A1 3/2007 Gauthier et al.
2007/0061266 A1 3/2007 Moore et al.
2007/0061487 A1 3/2007 Moore et al.
2007/0116292 A1 5/2007 Kurita et al.
2007/0118745 A1 5/2007 Buer
2007/0197261 A1 8/2007 Humbel
2007/0224969 A1 9/2007 Rao
2007/0241182 A1 10/2007 Buer
2007/0256134 A1 11/2007 Lehtonen et al.
2007/0258594 A1 11/2007 Sandhu et al.
2007/0276765 A1 11/2007 Hazel
2007/0278291 A1 12/2007 Rans et al.
2008/0008315 A1 1/2008 Fontana et al.
2008/0011831 A1 1/2008 Bonalle et al.
2008/0014867 A1 1/2008 Finn
2008/0035738 A1 2/2008 Mullen
2008/0071681 A1 3/2008 Khalid
2008/0072303 A1 3/2008 Syed
2008/0082452 A1 4/2008 Wankmueller
2008/0086767 A1 4/2008 Kulkarni et al.
2008/0099552 A1 5/2008 Grillion
2008/0103968 A1 5/2008 Bies et al.
2008/0109309 A1 5/2008 Andau et al.
2008/0110983 A1 5/2008 Ashfield
2008/0120711 A1 5/2008 Dispensa
2008/0156873 A1 7/2008 Wilhelm et al.
2008/0162312 A1 7/2008 Sklovsky et al.
2008/0164308 A1 7/2008 Aaron et al.
2008/0207307 A1 8/2008 Cunningham, II et al.
2008/0209543 A1 8/2008 Aaron
2008/0223918 A1 9/2008 Williams et al.
2008/0285746 A1 11/2008 Androck et al.
2008/0308641 A1 12/2008 Finn
2009/0037275 A1 2/2009 Pollio
2009/0048026 A1 2/2009 French
2009/0132417 A1 5/2009 Scipioni et al.
2009/0143104 A1 6/2009 Loh et al.
2009/0171682 A1 7/2009 Dixon et al.
2009/0210308 A1 8/2009 Toomer et al.
2009/0235339 A1 9/2009 Mennes et al.
2009/0249077 A1 10/2009 Gargaro et al.
2009/0282264 A1 11/2009 Ameil et al.
2010/0023449 A1 1/2010 Skowronek et al.
2010/0023455 A1 1/2010 Dispensa et al.
2010/0029202 A1 2/2010 Jolivet et al.
2010/0033310 A1 2/2010 Narendra et al.
2010/0036769 A1 2/2010 Winters et al.
2010/0078471 A1 4/2010 Lin et al.
2010/0082491 A1 4/2010 Rosenblatt et al.
2010/0094754 A1 4/2010 Bertran et al.
2010/0095130 A1 4/2010 Bertran et al.
2010/0100480 A1 4/2010 Altman et al.
2010/0114731 A1 5/2010 Kingston et al.
2010/0192230 A1 7/2010 Steeves et al.
2010/0207742 A1 8/2010 Buhot et al.
2010/0211797 A1 8/2010 Westerveld et al.
2010/0240413 A1 9/2010 He et al.
2010/0257357 A1 10/2010 McClain
2010/0312634 A1 12/2010 Cervenka
2010/0312635 A1 12/2010 Cervenka
2011/0028160 A1 2/2011 Roeding et al.
2011/0035604 A1 2/2011 Habraken
2011/0060631 A1 3/2011 Grossman et al.
2011/0068170 A1 3/2011 Lehman
2011/0084132 A1 4/2011 Tofighbakhsh
2011/0101093 A1 5/2011 Ehrensvard
2011/0113245 A1 5/2011 Varadarajan
2011/0125638 A1 5/2011 Davis et al.
2011/0131415 A1 6/2011 Schneider
2011/0153437 A1 6/2011 Archer et al.
2011/0153496 A1 6/2011 Royyuru
2011/0155801 A1 6/2011 Rowberry
2011/0208658 A1 8/2011 Makhotin
2011/0208965 A1 8/2011 Machani
2011/0211219 A1 9/2011 Bradley et al.
2011/0218911 A1 9/2011 Spodak
2011/0238564 A1 9/2011 Lim et al.
2011/0246780 A1 10/2011 Yeap et al.
2011/0258452 A1 10/2011 Coulier et al.
2011/0280406 A1 11/2011 Ma et al.
2011/0282785 A1 11/2011 Chin
2011/0294418 A1 12/2011 Chen
2011/0312271 A1 12/2011 Ma et al.
2012/0024947 A1 2/2012 Naelon
2012/0030047 A1 2/2012 Fuentes et al.

(56) References Cited

U.S. PATENT DOCUMENTS

| | | | |
|---|---|---|---|
| 2012/0030121 | A1 | 2/2012 | Grellier |
| 2012/0047071 | A1 | 2/2012 | Mullen et al. |
| 2012/0079281 | A1 | 3/2012 | Lowenstein et al. |
| 2012/0109735 | A1 | 5/2012 | Krawczewicz et al. |
| 2012/0109764 | A1 | 5/2012 | Martin et al. |
| 2012/0143703 | A1 | 6/2012 | Wall |
| 2012/0143754 | A1 | 6/2012 | Patel |
| 2012/0150737 | A1 | 6/2012 | Rottink et al. |
| 2012/0178366 | A1 | 7/2012 | Levy et al. |
| 2012/0196583 | A1 | 8/2012 | Kindo |
| 2012/0207305 | A1 | 8/2012 | Gallo et al. |
| 2012/0209773 | A1 | 8/2012 | Ranganathan |
| 2012/0238206 | A1 | 9/2012 | Singh et al. |
| 2012/0239560 | A1 | 9/2012 | Pourfallah et al. |
| 2012/0252350 | A1 | 10/2012 | Steinmetz et al. |
| 2012/0254394 | A1 | 10/2012 | Barras |
| 2012/0284194 | A1 | 11/2012 | Liu et al. |
| 2012/0290472 | A1 | 11/2012 | Mullen et al. |
| 2012/0296818 | A1 | 11/2012 | Nuzzi et al. |
| 2012/0316992 | A1 | 12/2012 | Oborne |
| 2012/0317035 | A1 | 12/2012 | Royyuru et al. |
| 2012/0317628 | A1 | 12/2012 | Yeager |
| 2013/0005245 | A1 | 1/2013 | Royston |
| 2013/0008956 | A1 | 1/2013 | Ashfield |
| 2013/0026229 | A1 | 1/2013 | Jarman et al. |
| 2013/0030997 | A1 | 1/2013 | Spodak |
| 2013/0048713 | A1 | 2/2013 | Pan |
| 2013/0054474 | A1 | 2/2013 | Yeager |
| 2013/0065564 | A1 | 3/2013 | Conner et al. |
| 2013/0080228 | A1 | 3/2013 | Fisher |
| 2013/0080229 | A1 | 3/2013 | Fisher |
| 2013/0099587 | A1 | 4/2013 | Lou et al. |
| 2013/0104251 | A1 | 4/2013 | Moore et al. |
| 2013/0106576 | A1 | 5/2013 | Hinman et al. |
| 2013/0119130 | A1 | 5/2013 | Braams |
| 2013/0130614 | A1 | 5/2013 | Busch-Sorensen |
| 2013/0144793 | A1 | 6/2013 | Royston |
| 2013/0146657 | A1 | 6/2013 | Graef |
| 2013/0171929 | A1 | 7/2013 | Adams et al. |
| 2013/0179351 | A1 | 7/2013 | Wallner |
| 2013/0185772 | A1 | 7/2013 | Jaudon et al. |
| 2013/0191279 | A1 | 7/2013 | Calman et al. |
| 2013/0200999 | A1 | 8/2013 | Spodak et al. |
| 2013/0211937 | A1 | 8/2013 | Elbirt |
| 2013/0216108 | A1 | 8/2013 | Hwang et al. |
| 2013/0226791 | A1 | 8/2013 | Springer et al. |
| 2013/0226796 | A1 | 8/2013 | Jiang et al. |
| 2013/0232082 | A1 | 9/2013 | Krawczewicz et al. |
| 2013/0238894 | A1 | 9/2013 | Ferg et al. |
| 2013/0282360 | A1 | 10/2013 | Shimota et al. |
| 2013/0303085 | A1 | 11/2013 | Boucher et al. |
| 2013/0304651 | A1 | 11/2013 | Smith |
| 2013/0311363 | A1 | 11/2013 | Ramaci |
| 2013/0312082 | A1 | 11/2013 | Izu et al. |
| 2013/0314593 | A1 | 11/2013 | Reznik et al. |
| 2013/0344857 | A1 | 12/2013 | Berionne et al. |
| 2014/0002238 | A1 | 1/2014 | Taveau et al. |
| 2014/0019352 | A1 | 1/2014 | Shrivastava |
| 2014/0027506 | A1 | 1/2014 | Heo et al. |
| 2014/0032409 | A1 | 1/2014 | Rosano |
| 2014/0032410 | A1 | 1/2014 | Georgiev et al. |
| 2014/0040120 | A1 | 2/2014 | Cho et al. |
| 2014/0040139 | A1 | 2/2014 | Brudnicki et al. |
| 2014/0040147 | A1 | 2/2014 | Varadarakan et al. |
| 2014/0047235 | A1 | 2/2014 | Lessiak et al. |
| 2014/0067690 | A1 | 3/2014 | Pitroda et al. |
| 2014/0074637 | A1 | 3/2014 | Hammad |
| 2014/0074655 | A1 | 3/2014 | Lim et al. |
| 2014/0081720 | A1 | 3/2014 | Wu |
| 2014/0081785 | A1 | 3/2014 | Valadas Preto |
| 2014/0138435 | A1 | 5/2014 | Khalid |
| 2014/0171034 | A1 | 6/2014 | Aleksin et al. |
| 2014/0171039 | A1 | 6/2014 | Bjontegard |
| 2014/0172700 | A1 | 6/2014 | Teuwen et al. |
| 2014/0180851 | A1 | 6/2014 | Fisher |
| 2014/0208112 | A1 | 7/2014 | McDonald et al. |
| 2014/0214674 | A1 | 7/2014 | Narula |
| 2014/0229375 | A1 | 8/2014 | Zaytzsev et al. |
| 2014/0245391 | A1 | 8/2014 | Adenuga |
| 2014/0256251 | A1 | 9/2014 | Caceres et al. |
| 2014/0258099 | A1 | 9/2014 | Rosano |
| 2014/0258113 | A1 | 9/2014 | Gauthier et al. |
| 2014/0258125 | A1 | 9/2014 | Gerber et al. |
| 2014/0274179 | A1 | 9/2014 | Zhu et al. |
| 2014/0279479 | A1 | 9/2014 | Maniar et al. |
| 2014/0337235 | A1 | 11/2014 | Van Heerden et al. |
| 2014/0339315 | A1 | 11/2014 | Ko |
| 2014/0346860 | A1 | 11/2014 | Aubry et al. |
| 2014/0365377 | A1 | 12/2014 | Salama |
| 2014/0365780 | A1 | 12/2014 | Movassaghi |
| 2014/0379361 | A1 | 12/2014 | Mahadkar et al. |
| 2015/0012444 | A1 | 1/2015 | Brown et al. |
| 2015/0032635 | A1 | 1/2015 | Guise |
| 2015/0071486 | A1 | 3/2015 | Rhoads et al. |
| 2015/0073983 | A1 | 3/2015 | Bartenstein |
| 2015/0088757 | A1 | 3/2015 | Zhou et al. |
| 2015/0089586 | A1 | 3/2015 | Ballesteros |
| 2015/0113271 | A1 | 4/2015 | Jooste |
| 2015/0134452 | A1 | 5/2015 | Williams |
| 2015/0134513 | A1 | 5/2015 | Olson |
| 2015/0140960 | A1 | 5/2015 | Powell et al. |
| 2015/0154595 | A1 | 6/2015 | Collinge et al. |
| 2015/0170138 | A1 | 6/2015 | Rao |
| 2015/0178724 | A1 | 6/2015 | Ngo et al. |
| 2015/0186871 | A1 | 7/2015 | Laracey |
| 2015/0199673 | A1 | 7/2015 | Savolainen |
| 2015/0199863 | A1 | 7/2015 | Scoggins |
| 2015/0205379 | A1 | 7/2015 | Mag et al. |
| 2015/0254637 | A1 | 9/2015 | Yang |
| 2015/0302409 | A1 | 10/2015 | Malek et al. |
| 2015/0317295 | A1 | 11/2015 | Sherry |
| 2015/0317626 | A1 | 11/2015 | Ran et al. |
| 2015/0332266 | A1 | 11/2015 | Friedlander et al. |
| 2015/0339474 | A1 | 11/2015 | Paz et al. |
| 2015/0371234 | A1 | 12/2015 | Huang et al. |
| 2016/0012465 | A1 | 1/2016 | Sharp |
| 2016/0026997 | A1 | 1/2016 | Tsui |
| 2016/0048913 | A1 | 2/2016 | Rausaria et al. |
| 2016/0055480 | A1 | 2/2016 | Shah |
| 2016/0057619 | A1 | 2/2016 | Lopez |
| 2016/0065370 | A1 | 3/2016 | Le Saint et al. |
| 2016/0078430 | A1 | 3/2016 | Douglas |
| 2016/0087957 | A1 | 3/2016 | Shah et al. |
| 2016/0092696 | A1 | 3/2016 | Guglani et al. |
| 2016/0148193 | A1 | 5/2016 | Kelley et al. |
| 2016/0189143 | A1 | 6/2016 | Koeppel |
| 2016/0232523 | A1 | 8/2016 | Venot et al. |
| 2016/0239672 | A1 | 8/2016 | Khan et al. |
| 2016/0253651 | A1 | 9/2016 | Park et al. |
| 2016/0255072 | A1 | 9/2016 | Liu |
| 2016/0267486 | A1 | 9/2016 | Mitra et al. |
| 2016/0277383 | A1 | 9/2016 | Guyomarc'h et al. |
| 2016/0277388 | A1 | 9/2016 | Lowe et al. |
| 2016/0307187 | A1 | 10/2016 | Guo et al. |
| 2016/0307189 | A1 | 10/2016 | Zarakas et al. |
| 2016/0314472 | A1 | 10/2016 | Ashfield |
| 2016/0330027 | A1 | 11/2016 | Ebrahimi |
| 2016/0335531 | A1 | 11/2016 | Mullen et al. |
| 2016/0379217 | A1 | 12/2016 | Hammad |
| 2017/0004502 | A1 | 1/2017 | Quentin et al. |
| 2017/0011395 | A1 | 1/2017 | Pillai et al. |
| 2017/0011406 | A1 | 1/2017 | Tunnell et al. |
| 2017/0017957 | A1 | 1/2017 | Radu |
| 2017/0017964 | A1 | 1/2017 | Janefalkar et al. |
| 2017/0024716 | A1 | 1/2017 | Jiam et al. |
| 2017/0039566 | A1 | 2/2017 | Schipperheijn |
| 2017/0041759 | A1 | 2/2017 | Gantert et al. |
| 2017/0068950 | A1 | 3/2017 | Kwon |
| 2017/0103388 | A1 | 4/2017 | Pillai et al. |
| 2017/0104739 | A1 | 4/2017 | Lansler et al. |
| 2017/0109509 | A1 | 4/2017 | Baghdasaryan |
| 2017/0109730 | A1 | 4/2017 | Locke et al. |
| 2017/0116447 | A1 | 4/2017 | Cimino et al. |
| 2017/0124568 | A1 | 5/2017 | Moghadam |

(56) References Cited

U.S. PATENT DOCUMENTS

2017/0140379 A1 5/2017 Deck
2017/0154328 A1 6/2017 Zarakas et al.
2017/0154333 A1 6/2017 Gleeson et al.
2017/0180134 A1 6/2017 King
2017/0230189 A1 8/2017 Toll et al.
2017/0237301 A1 8/2017 Elad et al.
2017/0289127 A1 10/2017 Hendrick
2017/0295013 A1 10/2017 Claes
2017/0316696 A1 11/2017 Bartel
2017/0317834 A1 11/2017 Smith et al.
2017/0330173 A1 11/2017 Woo et al.
2017/0374070 A1 12/2017 Shah et al.
2018/0034507 A1 2/2018 Wobak et al.
2018/0039986 A1 2/2018 Essebag et al.
2018/0039987 A1 2/2018 Molino
2018/0068316 A1 3/2018 Essebag et al.
2018/0129945 A1 5/2018 Saxena et al.
2018/0160255 A1 6/2018 Park
2018/0191501 A1 7/2018 Lindemann
2018/0205712 A1 7/2018 Versteeg et al.
2018/0240106 A1 8/2018 Garrett et al.
2018/0254909 A1 9/2018 Hancock
2018/0268132 A1 9/2018 Buer et al.
2018/0270214 A1 9/2018 Caterino et al.
2018/0294959 A1 10/2018 Traynor et al.
2018/0300716 A1 10/2018 Carlson
2018/0302396 A1 10/2018 Camenisch et al.
2018/0315050 A1 11/2018 Hammad
2018/0316666 A1 11/2018 Koved et al.
2018/0322486 A1 11/2018 Deliwala et al.
2018/0359100 A1 12/2018 Gaddam et al.
2019/0014107 A1 1/2019 George
2019/0019375 A1 1/2019 Foley
2019/0036678 A1 1/2019 Ahmed
2019/0172055 A1 6/2019 Hale
2019/0238517 A1 8/2019 D'Agostino et al.
2019/0303945 A1 10/2019 Mitra
2020/0014671 A1 1/2020 Isaacson et al.
2020/0111494 A1* 4/2020 Lau ........................ G06F 21/629
2021/0004806 A1 1/2021 Noe
2021/0272098 A1 9/2021 Delsuc
2021/0304189 A1 9/2021 Gupta
2021/0383360 A1 12/2021 Sinha
2021/0406869 A1 12/2021 Pathrabe
2022/0114581 A1 4/2022 Upadhye
2022/0284416 A1 9/2022 Rule
2022/0309509 A1 9/2022 Akgun
2022/0335412 A1 10/2022 Rule
2022/0366410 A1 11/2022 Rule
2022/0398566 A1 12/2022 Rule
2022/0414648 A1 12/2022 Rule
2023/0054157 A1 2/2023 Mao
2023/0065163 A1 3/2023 Vargas
2023/0083785 A1 3/2023 Maiman
2023/0169505 A1 6/2023 Rule
2023/0354020 A1 11/2023 Rule
2023/0359839 A1 11/2023 Lovgren

FOREIGN PATENT DOCUMENTS

CN 103023643 A 4/2013
CN 103417202 A 12/2013
EP 1085424 A1 3/2001
EP 1223565 A1 7/2002
EP 1265186 A2 12/2002
EP 1783919 A1 5/2007
EP 2139196 A1 12/2009
EP 1469419 A1 8/2012
EP 2852070 A1 3/2015
GB 2457221 A 8/2009
GB 2516861 A 2/2015
GB 2551907 A 1/2018
JP 2020523716 A * 8/2020 ........... G06F 16/951
KR 101508320 B1 4/2015
KR 20150140132 A 12/2015
NO 2008055170 A2 5/2008
WO 9910824 A1 3/1999
WO 0049586 A1 8/2000
WO 2006070189 A2 7/2006
WO 2009025605 A2 2/2009
WO 2010049252 A1 5/2010
WO 2011112158 A1 9/2011
WO 2012001624 A1 1/2012
WO 2013039395 A1 3/2013
WO 2013155562 A1 10/2013
WO 2013192358 A2 12/2013
WO 2014043278 A1 3/2014
WO 2014170741 A2 10/2014
WO 2015179649 A1 11/2015
WO 2015183818 A1 12/2015
WO 2016097718 A1 6/2016
WO 2016160816 A1 10/2016
WO 2016168394 A1 10/2016
WO 2017042375 A1 3/2017
WO 2017042400 A1 3/2017
WO 2017047855 A1 3/2017
WO 2017157859 A1 9/2017
WO 2017208063 A1 12/2017
WO 2018063809 A1 4/2018
WO 2018137888 A1 8/2018
WO 2019022585 A1 1/2019
WO 2020154600 A1 7/2020
WO 2020160065 A1 8/2020
WO 2021051884 A1 3/2021
WO 2021133492 A1 7/2021
WO 2022108959 A1 5/2022
WO 2022187350 A1 9/2022
WO 2023017943 A1 2/2023
WO 2023064063 A1 4/2023

OTHER PUBLICATIONS

International Search Report and Written Opinion for Application No. PCT/US2022/025285, mailed Jul. 19, 2022, 13 pages.

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B - Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(56) References Cited

OTHER PUBLICATIONS

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/ bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.
Hazarika Pinku et al., "Recommendations for Webview Based Mobile Applications on Android", 2014 IEEE International Conference On Advanced Communications, Control and Computing Technologies, IEEE, May 8, 2014 (May 8, 2014), pp. 1589-1592, DOI: 10.1109/ICACCCT.2014.7019375.

(56) References Cited

OTHER PUBLICATIONS

No. 693: What is WebView?, [online], Jan. 27, 2015, [Accessed Apr. 16, 2026] https://ktai.watch.impress.co.jp/docs/column/keyword/685512.html.

* cited by examiner

AUTOFILLING DATA BASED ON ACCOUNT AUTHENTICATION USING A CONTACTLESS CARD

BACKGROUND

Account identifiers for payment cards may include long numeric and/or character strings. As such, it may be difficult for a user to manually enter the account identifier correctly. Indeed, users often make mistakes and enter incorrect account numbers into payment interfaces on computing devices. Furthermore, processes have been developed that allow cameras or other malicious entities to capture and identify account identifiers entered in a device, thereby posing security risks.

BRIEF SUMMARY

In one aspect, a method, includes identifying, by a web browser executing on a processor of a device, a payment field in a web page, determining, by the web browser, that an application associated with an issuer of a contactless card is installed on the device, generating, by the web browser, a uniform resource identifier (URI) directed to the application, where the URI includes a merchant identifier parameter, a session identifier parameter, and an action identifier parameter, launching, by a mobile operating system (OS) executing on the processor, the application based on the URI, authenticating, by the application based on the action identifier parameter of the URI, an account associated with the contactless card based on a cryptogram generated by the contactless card, receiving, by the application based on the authentication, payment information associated with the contactless card, accessing, by a WebView component of the application, the web page, autofilling, by the WebView component of the application, the payment information into the payment field in the web page, and processing, by the WebView component of the application, a transaction based on the payment information autofilled into the payment field of the web page. Other embodiments are described and claimed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
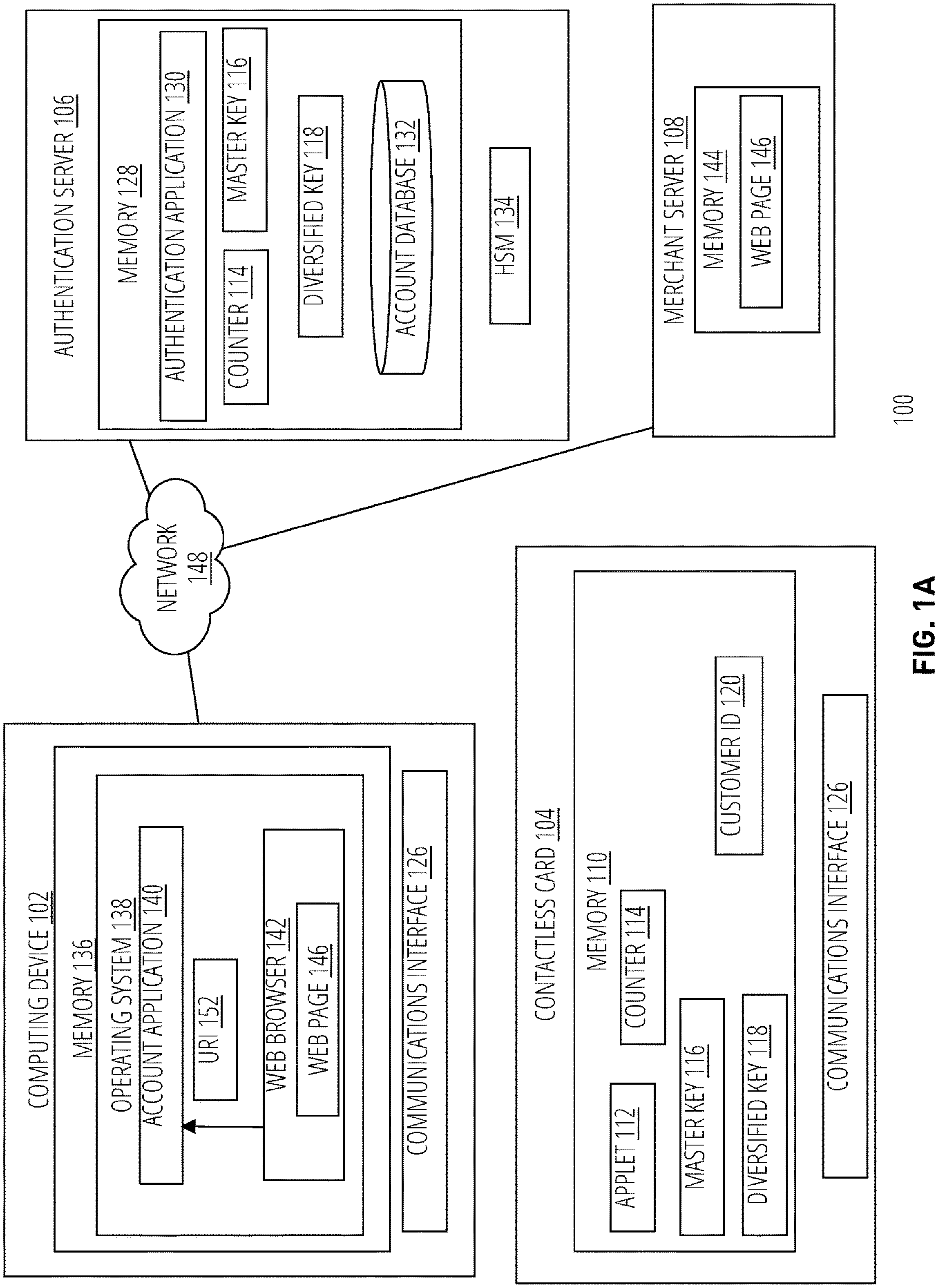
FIG. 1A illustrates an aspect of the subject matter in accordance with one embodiment.

Embodiments disclosed herein provide techniques to securely autofill data in a web browser using a contactless card. Generally, a web browser may load a web page that includes one or more payment form fields. The browser may detect the payment form fields and determine whether an application is installed on the device, where the application is associated with an issuer of the contactless card (e.g., an account management application provided by a financial institution associated with the contactless card). If the browser determines that the application is installed, the browser may generate a uniform resource identifier (URI) that is directed to the application. The browser may include, as parameters of the URI, a merchant identifier (ID) parameter, a session ID parameter, and an action ID parameter.

An operating system on the device may process the URI to launch the account application. The application may process the parameters of the URI and determine to output, based on the action identifier, an account authentication page of the application. The authentication page may include one or more functions to authenticate an account, such as via login/password, biometrics, or one-tap authentication based on a cryptogram generated by the contactless card based on tapping the card to the device.

In at least one embodiment, once the account is authenticated, the application may reload the web page in a WebView component of the application. By using the merchant ID and the session ID of the URI, the WebView component receives and restores the user's browsing session that was initiated in the web browser. The account application may receive (e.g., from a server and/or the contactless card) or otherwise store payment information associated with the contactless card (e.g., an account number, expiration date, and card verification value (CVV)). The payment information may be autofilled into the payment form in the WebView component. Once autofilled, the purchase may be completed by submitting the form in the WebView component.

In at least one embodiment, once the account is authenticated, the application may initiate a local server on the device, where the local server is only accessible to applications executing on the same device as the local server. A connection between the local server and the web browser may be established. The web browser may receive the payment information from the local server, and autofill the payment information into the form fields in the web browser. Once autofilled, the purchase may be completed by submitting the form in the web browser.

Advantageously, embodiments disclosed herein provide secure autofilling of data in web browsers. By leveraging cryptograms generated by contactless cards, embodiments of the disclosure may securely verify the identity of the user with minimal risk of fraudulent activity. Furthermore, doing so ensures that autofill operations are only performed when the user has access to a contactless card that facilitates the cryptogram verification with the server. Furthermore, by leveraging the WebView component or the local server, certain restrictions imposed on the web browser may be avoided. For example, some operating systems and/or web browsers may not allow the web browser to directly communicate with the account application. Therefore, by using the WebView component and/or the local server, these restrictions may be overcome, allowing users to securely autofill payment information for a purchase. Furthermore, by providing the disclosed autofill functionality in web browsers, many different web sites can leverage the autofilling without requiring integration into every web site or application.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1E has a limited number of elements in a certain topology, it may be appreciated that the computing architecture 100 may include more or less elements in alternate topologies as desired for a given implementation.

The computing architecture 100 comprises one or more computing devices 102, one or more authentication servers 106, one or more contactless cards 104, and one or more merchant servers 108. The contactless card 104 is representative of any type of card, such as a credit card, debit card, ATM card, gift card, payment card, smart card, and the like. The contactless card 104 may comprise one or more communications interfaces 126, such as a radio frequency identification (RFID) chip, configured to communicate with a communications interface 126 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing systems, merchant terminals, point-of-sale systems, servers, desktop computers, and the like. A mobile device may be used as an example of the computing device 102, but should not be considered limiting of the disclosure. The authentication server 106 and merchant server 108 are representative of any type of computing device, such as a server, workstation, compute cluster, cloud computing platform, virtualized computing system, and the like. Although not depicted for the sake of clarity, the computing device 102, contactless card 104, authentication server 106, and merchant server 108 each include one or more processor circuits, e.g. to execute programs, code, and/or instructions.

As shown, a memory 110 of the contactless card 104 includes an applet 112, a counter 114, a master key 116, a diversified key 118, and a unique customer identifier (ID) 120. The applet 112 is executable code configured to perform the operations described herein. The counter 114, master key 116, diversified key 118, and customer ID 120 are used to provide security in the system 100 as described in greater detail below.

As shown, a memory 128 of the authentication server 106 includes an authentication application 130 and an account database 132. The account database 132 generally includes information related to an account holder (e.g., one or more users), one or more accounts of the account holder, and one or more contactless cards 104 of the account. For each contactless card associated with a financial institution associated with the authentication server 106, the authentication server 106 may store corresponding instances of the master key 116 and counter 114.

As shown, a memory 136 of the computing device 102 includes an instance of an operating system 138. Example operating systems include the Android® OS, iOS®, macOS®, Linux®, and Windows® operating systems. As shown, the operating system 138 includes an account application 140 and a web browser 142. The account application 140 allows users to perform various account-related operations, such as activating payment cards, viewing account balances, purchasing items, processing payments, and the like. In some embodiments, a user may authenticate using authentication credentials to access certain features of the account application 140. For example, the authentication credentials may include a username (or login) and password, biometric credentials (e.g., fingerprints, Face ID, etc.), and the like. The web browser 142 is an application that allows the computing device 102 to access information via the network 148 (e.g., via the Internet). For example, using the web browser 142, the user may access one or more resources of the merchant server 108, such as the web page 146 stored in the memory 144 of the merchant server 108, which may be one of a plurality of web pages hosted by the merchant server 108 (or another hosting entity).

When accessing web pages or other content provided by merchant server 108, a user may select one or more products, services, or other items for purchase via the web browser 142. For example, the user may wish to purchase a basketball and a soccer ball, and may add these items to their shopping cart. To complete the purchase, the web page 146 may include a form with one or more payment fields. The payment fields may include fields for an account number, expiration date, CVV, customer name, and customer billing address. However, certain restrictions may prevent data from being autofilled into these payment fields. For example, the OS and/or web browser 142 may restrict the account application 140 from providing payment data to be autofilled into the form. Advantageously, however, embodiments disclosed herein provide solutions to autofill payment information into the form fields of the form.

To begin the autofill process, the web browser 142 may identify the one or more payment fields in the form of the web page 146, e.g., based on metadata of the form fields, receiving selection of one of the form fields, etc. The web browser 142 and/or the web page 146 may then determine whether the account application 140 is installed on the computing device 102. The web browser 142 and/or the web page 146 may use any feasible technique to determine whether the account application 140 is installed. For example, in iOS, the web browser 142 and/or the web page 146 may use the canOpenURL( ) method to determine whether a URI directed to the account application 140 may be opened. The method may generally return an indication of whether or not the URI can be opened. Doing so allows the web browser 142 and/or the web page 146 to determine that the account application 140 is installed on the computing device 102.

In some operating systems, such as the Android OS, the web browser 142 and/or the web page 146 may use a content provider service to determine whether the account application 140 is installed on the device 102. For example, the web browser 142 and/or the web page 146 may provide a URI directed to the account application 140 to the content provider service, which may return an indication of whether or not the URI can be opened. Doing so allows the web browser 142 and/or the web page 146 to determine that the account application 140 is installed on the computing device 102.

In some embodiments, additional and/or alternate techniques may be used to determine whether the account application 140 is installed on the device 102 for any type of operating system. For example, some operating systems may require that native code in native applications call certain functions, e.g., the canOpenURL( )method in iOS, or the content provider service in Android. In such embodiments, the web browser 142 and/or the web page 146 may execute code (e.g., JavaScript) to start a timer with a timeout threshold (100 milliseconds, 1 second, etc.) with a callback that will redirect to a web page that handles the case when the account application 140 is not installed (e.g., a page that generally indicates the account application 140 is not installed). Then web browser 142 and/or the web page 146 may then try to launch the account application 140. If the account application 140 is successfully launched before the timer elapses, the timer is cancelled, and autofill processing proceeds as discussed herein. If, however, the account application 140 is not launched before the timer elapses, the web browser 142 will be redirected to the timeout page, and the autofill process ends.

Once the web browser 142 and/or the web page 146 determines the account application 140 is installed, the web browser 142 and/or the web page 146 may generate a URI 152 directed to the account application 140. At least a portion of the URI 152 may be directed to the account application 140 based on the account application 140 being registered with the OS. Examples may include "example://auth" or "www.example.com/auth". Furthermore, the URI 152 may include one or more parameters. The parameters may include a merchant ID parameter, a session ID parameter, and an action ID parameter. The merchant ID parameter may be associated with a specific merchant, such as the merchant associated with the merchant server 108. Therefore, the account application 140 may uniquely identify each of a plurality of merchants using a respective merchant ID parameter of a plurality of merchant ID parameters. Doing so allows the account application 140 to identify addresses of the merchant server 108 associated with the merchant ID and/or identify addresses of any web pages 146 associated with the merchant ID. The session ID parameter may identify the browsing session in the web browser 142 vis a vis the merchant server 108. For example, the session ID parameter may be used to identify a shopping cart, items in the cart, pages previously visited, a current page displayed in the web browser 142 (e.g., the web page 146), and the like. The action ID may generally specify, to the account application 140, an action or operation to be performed. For example, in some embodiments, the action ID may instruct the account application 140 to open an authentication page. Therefore, the URI 152 may be a deep link to one or more pages of the account application 140. Examples of the URI 152 may include "example://auth?merchID=123&sessID=ABC&actID=456" or "www.example.com/?merchID=123&sessID=ABC&actID=456".

Once generated, the OS may process the URI 152, which causes the OS to open, access, or otherwise display the account application 140. Doing so further provides the URI 152 including the parameters to the account application 140. Based on the action ID parameter of the URI 152, the account application 140 may open an account authentication page to facilitate the autofill techniques described herein.

However, in some embodiments, the web browser 142 and/or the web page 146 generates and accesses the URI 152 without determining the account application 140 is installed. If the URI 152, when accessed, successfully launches the account application 140, and the autofill processing proceeds as described herein (with or without an explicit determination by the web browser 142 and/or the web page 146 that the account application 140 is installed). Otherwise, the account application 140 is not installed, and the web browser 142 is redirected to the timeout page indicating the account application 140 is not installed.

Figure 1B:
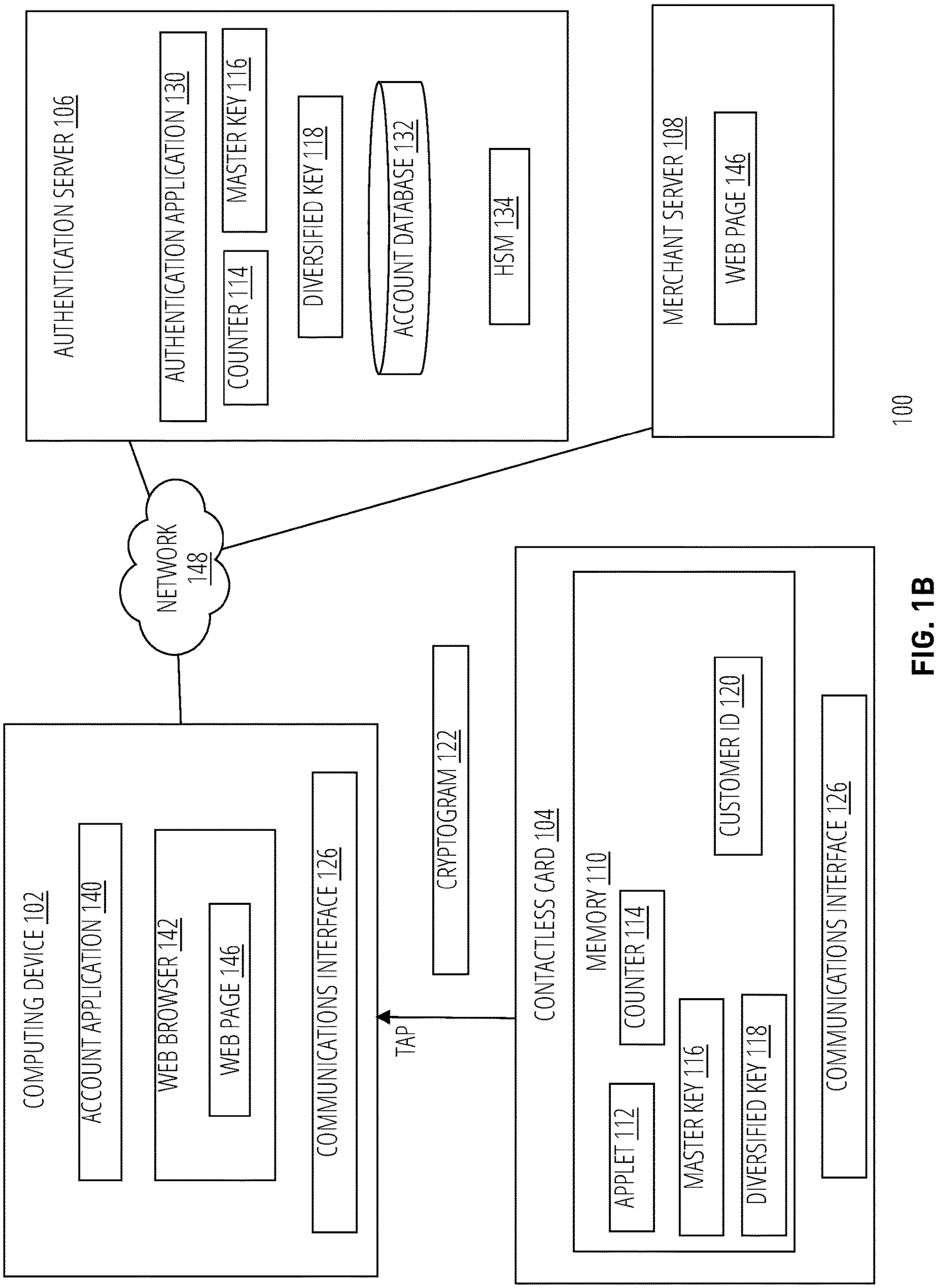
FIG. 1B illustrates an aspect of the subject matter in accordance with one embodiment.

FIG. 1B depicts an embodiment where the OS has accessed the URI 152 and the account application 140 has loaded the account authentication page. Generally, the account authentication page allows users to authenticate their account, e.g., via a login and password, biometrics, or a one-tap authentication based on a cryptogram 122 generated by the contactless card 104.

In the embodiment depicted in FIG. 1B, the user may tap the contactless card 104 to the computing device 102 (or otherwise bring the contactless card 104 within communications range of the communications interface 126 of the device 102). The applet 112 of the contactless card 104 may then generate a cryptogram 122.

The cryptogram 122 may be based on the customer ID 120 of the contactless card 104. The cryptogram 122 may be generated based on any suitable cryptographic technique. In some embodiments, the applet 112 may include an unencrypted identifier (e.g., the customer ID 120, an identifier of the contactless card 104, and/or any other unique identifier) as part of a data package including the cryptogram 122. In at least one embodiment, the data package is an NDEF file.

As stated, the computing architecture 100 is configured to implement key diversification to secure data, which may be referred to as a key diversification technique herein. Generally, the authentication server 106 (or another computing device) and the contactless card 104 may be provisioned with the same master key 116 (also referred to as a master symmetric key). More specifically, each contactless card 104 is programmed with a distinct master key 116 that has a corresponding pair in the authentication server 106. For example, when a contactless card 104 is manufactured, a unique master key 116 may be programmed into the memory 110 of the contactless card 104. Similarly, the unique master key 116 may be stored in a record of a customer associated with the contactless card 104 in the account database 132 of the authentication server 106 (and/or stored in a different secure location, such as the hardware security module (HSM) 134). The master key 116 may be kept secret from all parties other than the contactless card 104 and authentication server 106, thereby enhancing security of the system 100. In some embodiments, the applet 112 of the contactless card 104 may encrypt and/or decrypt data (e.g., the customer ID 120) using the master key 116 and the data as input to a cryptographic algorithm. For example, encrypting the customer ID 120 with the master key 116 may result in the cryptogram 122. Similarly, the authentication server 106 may encrypt and/or decrypt data associated with the contactless card 104 using the corresponding master key 116.

In some embodiments, the master keys 116 of the contactless card 104 and authentication server 106 may be used in conjunction with the counters 114 to enhance security using key diversification. The counters 114 comprise values that are synchronized between the contactless card 104 and authentication server 106. For example, the counters 114 may comprise a number that changes each time data is exchanged between the contactless card 104 and the authentication server 106 (and/or the contactless card 104 and the computing device 102). Generally, the applet 112 may provide the master key 116, unique customer ID 120, and a diversification factor as input to a cryptographic algorithm, thereby producing a diversified key 118. In some embodiments, the diversification factor is the counter 114. The diversified key 118 may then be used to encrypt some data, such as the diversification factor (e.g., the counter 114) or other sensitive data. The applet 112 and the authentication server 106 may be configured to encrypt the same type of data to facilitate the decryption and/or verification processing of the cryptogram 122.

More generally, when preparing to send data (e.g., to the authentication server 106 and/or the computing device 102), the applet 112 of the contactless card 104 may increment the counter 114. The applet 112 of the contactless card 104 may then provide the master keys 116, customer ID 120, and counter 114 as input to a cryptographic algorithm, which produces a diversified key 118 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

The applet 112 may then encrypt some data (e.g., the unique customer ID 120, the counter 114, a command, and/or any other data) using the diversified key 118 and the data as input to the cryptographic algorithm. For example, encrypting the unique customer ID 120 the diversified key 118 may result in an encrypted unique customer ID 120_ (e.g., a cryptogram 122).

In some embodiments, two diversified keys 118 may be generated, e.g., based on one or more portions of the input to the cryptographic function. In some embodiments, the two diversified keys 118 are generated based on two distinct master keys 116, the unique customer ID 120, and the counter 114. In such embodiments, a message authentication code (MAC) is generated using one of the diversified keys 118, and the MAC may be encrypted using the other one of the diversified keys 118. The MAC may be generated based on any suitable data input to a MAC algorithm, such as sensitive data, the unique customer ID 120, the counter 114, etc. More generally, the applet 112 and the authentication server 106 may be configured to generate the MAC based on the same data. In some embodiments, the cryptogram 122 is included in a data package such as an NDEF file. The account application 140 may then read the data package including cryptogram 122 via the communications interface 126 of the computing device 102.

Figure 1C:
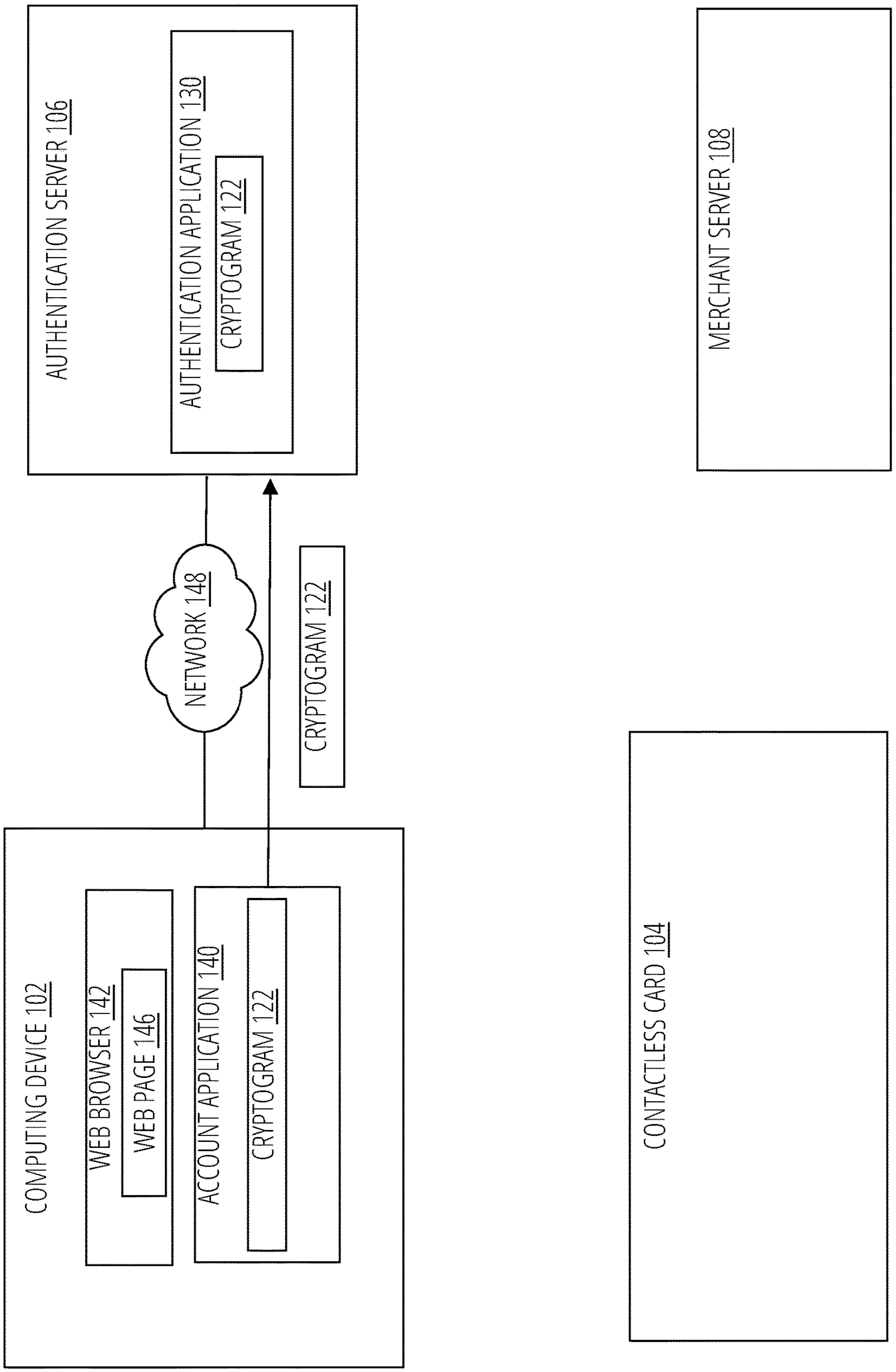
FIG. 1C illustrates an aspect of the subject matter in accordance with one embodiment.

FIG. 1C depicts an embodiment where the account application 140 transmits the data package including the cryptogram 122 to the authentication server 106. The authentication server 106 may provide the cryptogram 122 to the authentication application 130 and/or the HSM 134 for verification based at least in part on the instance of the master key 116 stored by the authentication server 106. In some embodiments, the authentication application 130 and/or the HSM 134 may identify the master key 116 and counter 114 using the unencrypted customer ID 120 provided to the server 106 with the cryptogram 122. In some examples, the authentication application 130 may provide the master key 116, unique customer ID 120, and counter 114 as input to the cryptographic algorithm, which produces one or more diversified keys 118 as output. The resulting diversified keys 118 may correspond to the diversified keys 118 of the contactless card 104, which may be used to decrypt the cryptogram 122 and/or verify the MAC once decrypted. For example, the authentication server 106 may generate a MAC based on the same data as the applet 112, e.g., the sensitive data, the unique customer ID 120, and/or the counter 116. If the MAC generated by the authentication server 106 matches the decrypted MAC in the cryptogram 122, the authentication server 106 may verify or otherwise authenticate the cryptogram 122.

Regardless of the verification technique used, the authentication application 130 and/or the HSM 134 may successfully decrypt the cryptogram 122 and verify the MAC, thereby verifying or authenticating the cryptogram 122.

If the decryption is successful, the authentication application 130 may transmit a decryption result 150 to the account application 140. In some embodiments, the decryption result 150 may include data to be autofilled into the payment forms to pay for a purchase with the merchant server 108. However, if the authentication application 130 is unable to decrypt the cryptogram 122 to yield the expected result (e.g., the customer ID 120 of the account associated with the contactless card 104), the authentication application 130 does not validate the cryptogram 122. In such an example, the authentication application 130 determines to terminate the autofill process. The authentication application 130 may transmit an indication of the failed decryption to the computing device 102.

Figure 1D:
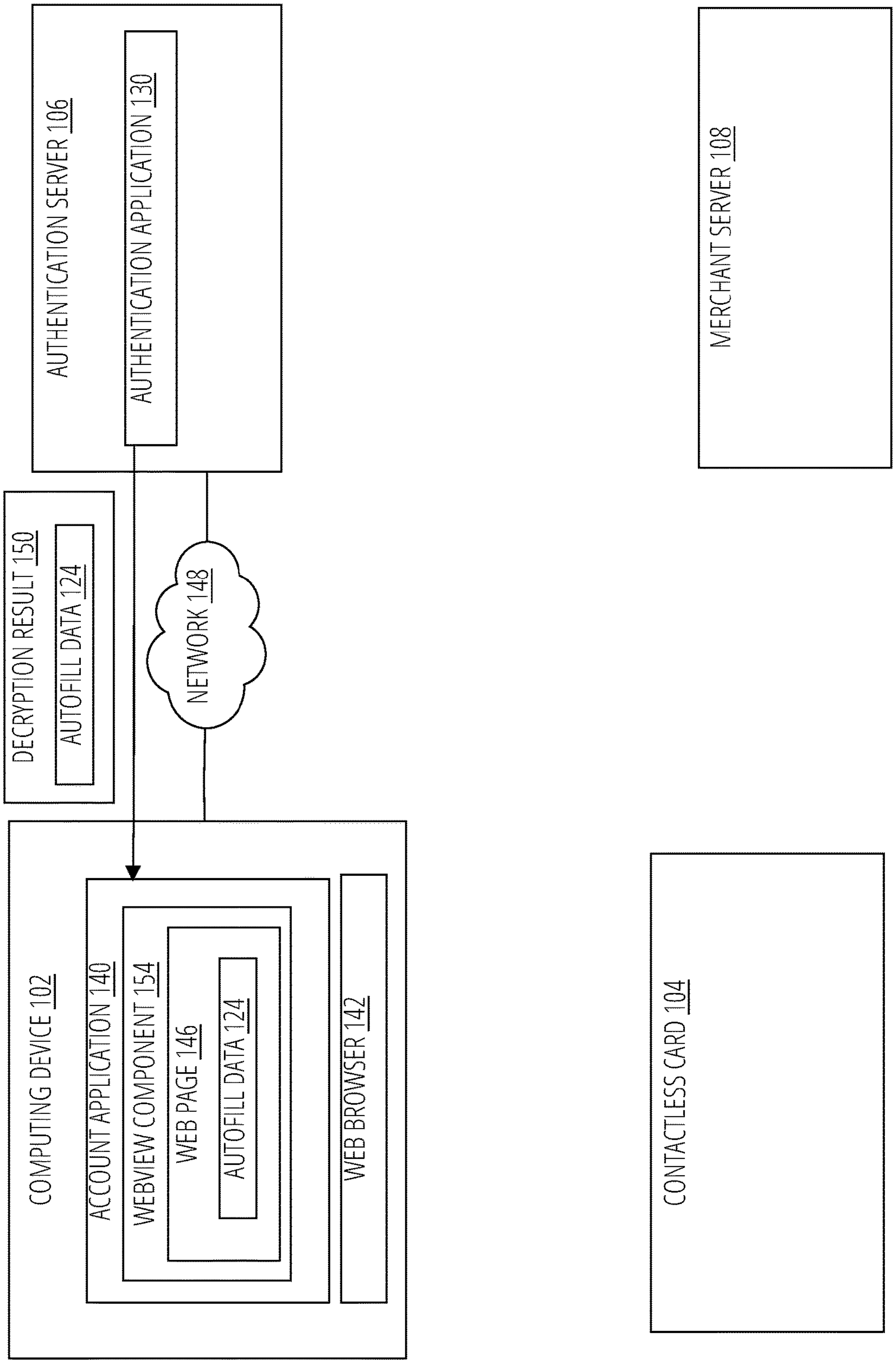
FIG. 1D illustrates an aspect of the subject matter in accordance with one embodiment.

FIG. 1D depicts an embodiment where the authentication application 130 transmits a decryption result 150 to the account application 140. The decryption result 150 generally reflects whether or not the cryptogram 122 was decrypted. In the example depicted in FIG. 1D, the decryption result 150 may indicate the authentication server 106 decrypted the cryptogram 122. Doing so may allow the account application 140 to determine that the cryptogram 122 was successfully decrypted prior to continuing the autofill process, thereby improving security.

As shown, the authentication server 106 may further transmit autofill data 124 to the account application 140. Although depicted as being transmitted with the decryption result 150, the autofill data 124 may be transmitted separate from the decryption result 150. Furthermore, in some embodiments, the autofill data 124 may be received from the server 106 responsive to another tap of the contactless card 104 to the computing device 102, which causes another cryptogram to be generated, which is verified by the authentication server 106. In other embodiments, the autofill data 124 is received directly from the contactless card 104 (e.g., via a direct read via the communications interface 126). In other embodiments, the account application 140 retrieves the autofill data 124 in a local database stored on the computing device 102. The autofill data 124 may generally include an account number of the contactless card 104, an expiration date of the contactless card 104, a CVV of the contactless card 104, a customer name associated with the contactless card 104, and a customer billing address associated with the contactless card 104. In some embodiments, the account number may be a one-time use virtual account number associated with the contactless card 104.

In some embodiments, the authentication server 106 may generate a payment token as the autofill data 124. In such embodiments, the authentication server 106 may provide the payment token to the merchant server 108 and/or the computing device 102.

As shown, responsive to receiving the decryption result 150, the account application 140 may launch a WebView component 154. The WebView component 154 is generally configured to access and display web content, such as the web page 146, but lacks some features of the web browser 142. Stated differently, the WebView component 154 is an in-app web browser of the account application 140 that is distinct from the web browser 142. Generally, the account application 140 may launch the WebView component 154 within the account application 140 to load web-based content within the account application 140.

The account application 140 may cause the WebView component 154 to receive and restore the user's browsing session from the web browser 142 with the merchant server 108. For example, the account application 140 may use the merchant ID and session ID of the URI 152 to generate a URL (and/or URI) directed to the web page 146. The URL directed to the web page 146 may include the parameters to allow the web page 146 to be loaded in the WebView component 154 while maintaining the browsing session from the web browser 142. For example, the merchant ID may be associated with a base URL (e.g., www.example.com) and the session ID may be included as a parameter of the base URL to create a URL directed to the web page 146 and/or the merchant server 108. Examples may include "www.example.com/page.html?sessID=ABC." Once the URL generated by the account application 140 is accessed by the WebView component 154, the WebView component 154 may load the web page 146 to replicate the user's browsing session from the web browser 142. For example, the web page 146 including a payment form may be rendered in the WebView component 154 allowing the user to purchase one or more items the user previously added to their shopping cart in the web browser 142. Continuing with the above example, the WebView component 154 may load the web page 146 which reflects the user's shopping cart, which includes a basketball and a soccer ball.

Advantageously, the WebView component 154 may autofill the autofill data 124 into the one or more payment fields of the web page 146. In some embodiments, the WebView component 154 uses an autofill service provided by the account application 140. In some embodiments, the WebView component 154 uses an autofill service provided by the operating system 138. Regardless of the autofill technique used, the user may submit the form including the autofilled data to complete the purchase.

In embodiments where the authentication server 106 generates a payment token, the web page 146 loaded by the WebView component 154 may include the payment token. The payment token may be provided by the merchant server 108 to the WebView component 154, or by the account application 140 to the WebView component 154. The payment token may be used to process the purchase.

Figure 1E:
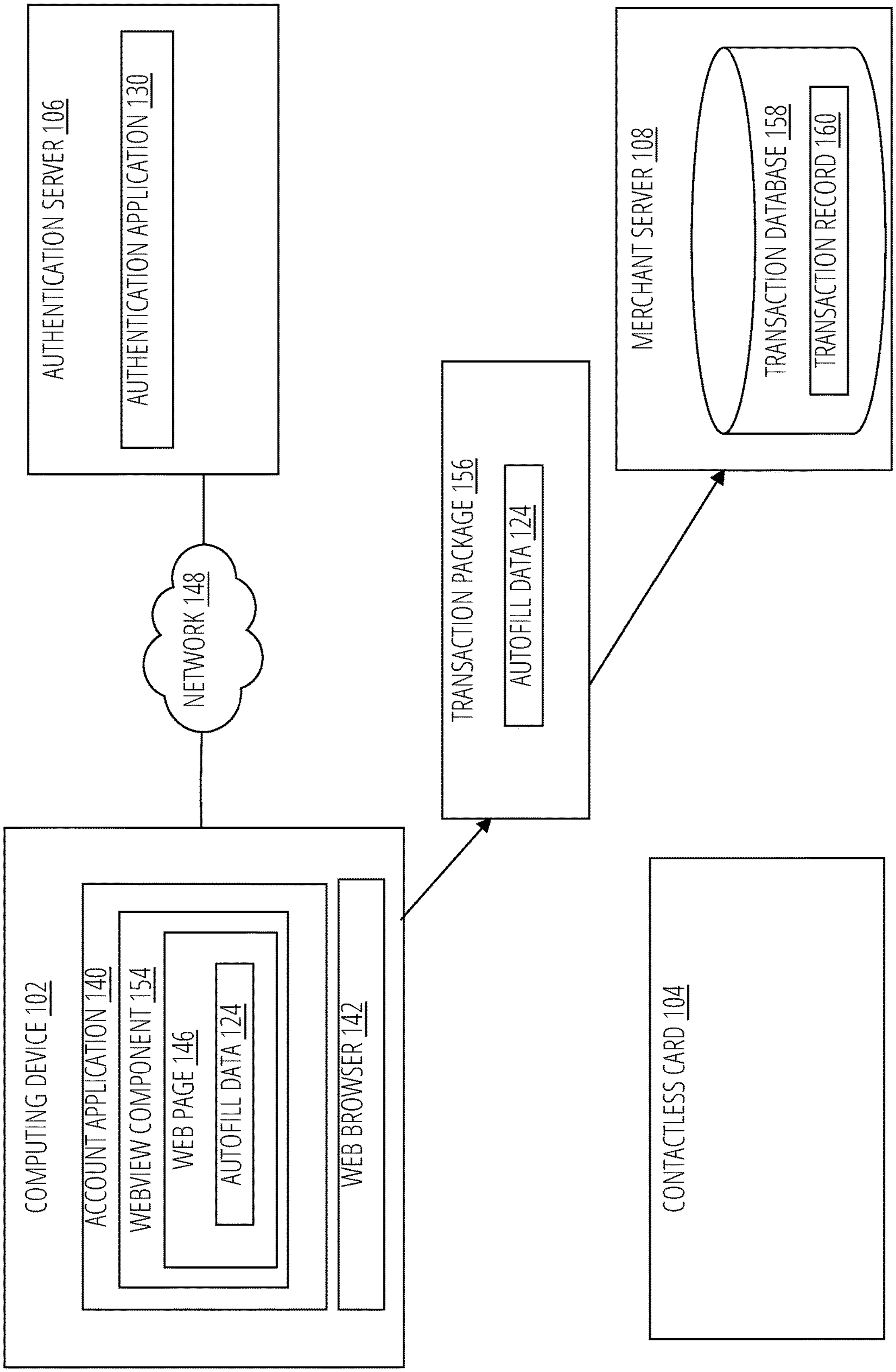
FIG. 1E illustrates an aspect of the subject matter in accordance with one embodiment.

FIG. 1E depicts an embodiment where the WebView component 154 generates a transaction package 156 to process a payment using the autofill data 124 filled into the form fields of the web page 146. Generally, the transaction package 156 may be transmitted according to the hypertext transfer protocol (HTTP). Once received, the merchant server 108 may process payment for the transaction using the autofill data 124. The merchant server 108 may then create a transaction record 160 for the transaction in a transaction database 158. As stated, however, in some embodiments, the payment token is used instead of the autofill data 124 to pay for the transaction.

Figure 2A:
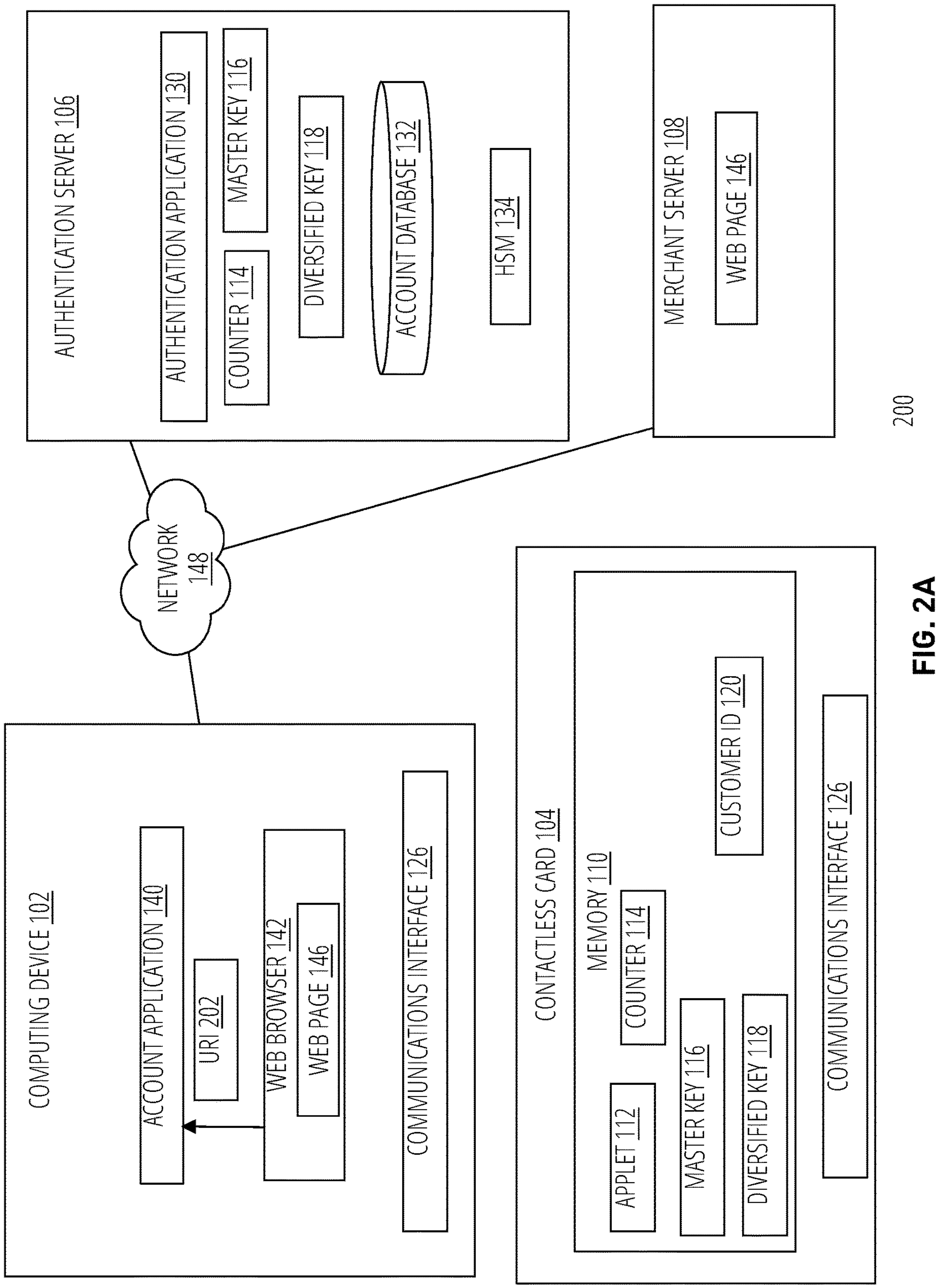
FIG. 2A illustrates an aspect of the subject matter in accordance with one embodiment.

FIG. 2A depicts an example schematic 200 for using a local server to autofill data into the web browser 142, according to various embodiments. Although the computing architecture 200 shown in FIGS. 2A-2E has a limited number of elements in a certain topology, it may be appreciated that the computing architecture 200 may include more or less elements in alternate topologies as desired for a given implementation.

As shown in FIG. 2A, the user may use the web browser 142 to select one or more items for purchase via the merchant server 108. For example, the user may wish to purchase an orange and an apple, and have these items in their shopping cart. To complete the purchase, the web page 146 may include a form with one or more payment fields. The payment fields may include fields for an account number, expiration date, CVV, customer name, and customer billing address. As stated, however, certain restrictions may prevent data from being autofilled into these payment fields. For example, the OS and/or web browser 142 may restrict the account application 140 from providing payment data to be autofilled into the form. Advantageously, however, the account application 140 may use a local server to autofill payment information into the form fields of the form of the web page 146.

To begin the autofill process, the web browser 142 may identify the one or more payment fields in the form of the web page 146. The web browser 142 and/or the web page 146 may then determine whether the account application 140 is installed on the computing device 102. The web browser 142 and/or the web page 146 may use any feasible technique to determine whether the account application 140 is installed. For example, in some operating systems such as iOS, the web browser 142 and/or the web page 146 may use the canOpenURL( ) method to determine whether a URI directed to the account application 140 may be opened. The method may generally return an indication of whether or not the URI can be opened. Doing so allows the web browser 142 and/or the web page 146 to determine that the account application 140 is installed on the computing device 102.

In some operating systems, such as the Android OS, the web browser 142 and/or the web page 146 may use the content provider service to determine whether the account application 140 is installed on the device. For example, the web browser 142 and/or the web page 146 may provide a URI directed to the account application 140 to the content provider service, which may return an indication of whether or not the URI can be opened. Doing so allows the web browser 142 and/or the web page 146 to determine that the account application 140 is installed on the computing device 102.

Once the web browser 142 and/or the web page 146 determines the account application 140 is installed, the web browser 142 and/or the web page 146 may generate a URI 202 directed to the account application 140. The URI 202 may be generated based on the same techniques to generate the URI 152. At least a portion of the URI 202 may be directed to the account application 140 based on the account application 140 being registered with the OS. Furthermore, the URI 202 may include one or more parameters. The parameters may include a merchant ID parameter, a session ID parameter, and an action ID parameter. As stated, the merchant ID parameter may be associated with a specific merchant, such as the merchant associated with the merchant server 108. Therefore, as stated, each of a plurality of merchants may be uniquely identified by a respective merchant ID parameter. Doing so allows the account application 140 to identify the merchant server 108 associated with the merchant ID and/or identify any web pages 146 associated with the merchant ID. The session ID parameter may identify the browsing session in the web browser 142 vis a vis the merchant server 108. For example, the session ID parameter may be used to identify a shopping cart, items in the shopping cart, pages previously visited, a current page displayed in the web browser 142 (e.g., the web page 146), and the like. The action ID may generally specify, to the account application 140, an action or operation to be performed. For example, in some embodiments, the action ID may instruct the account application 140 to open an authentication page. Therefore, the URI 202 may be a deep link to one or more pages of the account application 140.

Once generated, the OS may process the URI 202, which causes the OS to open, access, or otherwise display the account application 140. Doing so further provides the URI 202, including the parameters, to the account application 140. Based on the action ID parameter of the URI 202, the account application 140 may open an account authentication page to facilitate the autofill techniques described herein.

As stated, in some embodiments, the web browser 142 and/or the web page 146 may use the timer and attempt to launch the URI 202 without predetermining that the account application 140 is installed. In such embodiments, if the account application 140 is successfully launched based on the URI 202, the autofill processing proceeds as described herein. If, however, the time expires without the account application 140 launching on the device, the autofill processing ends.

Figure 2B:
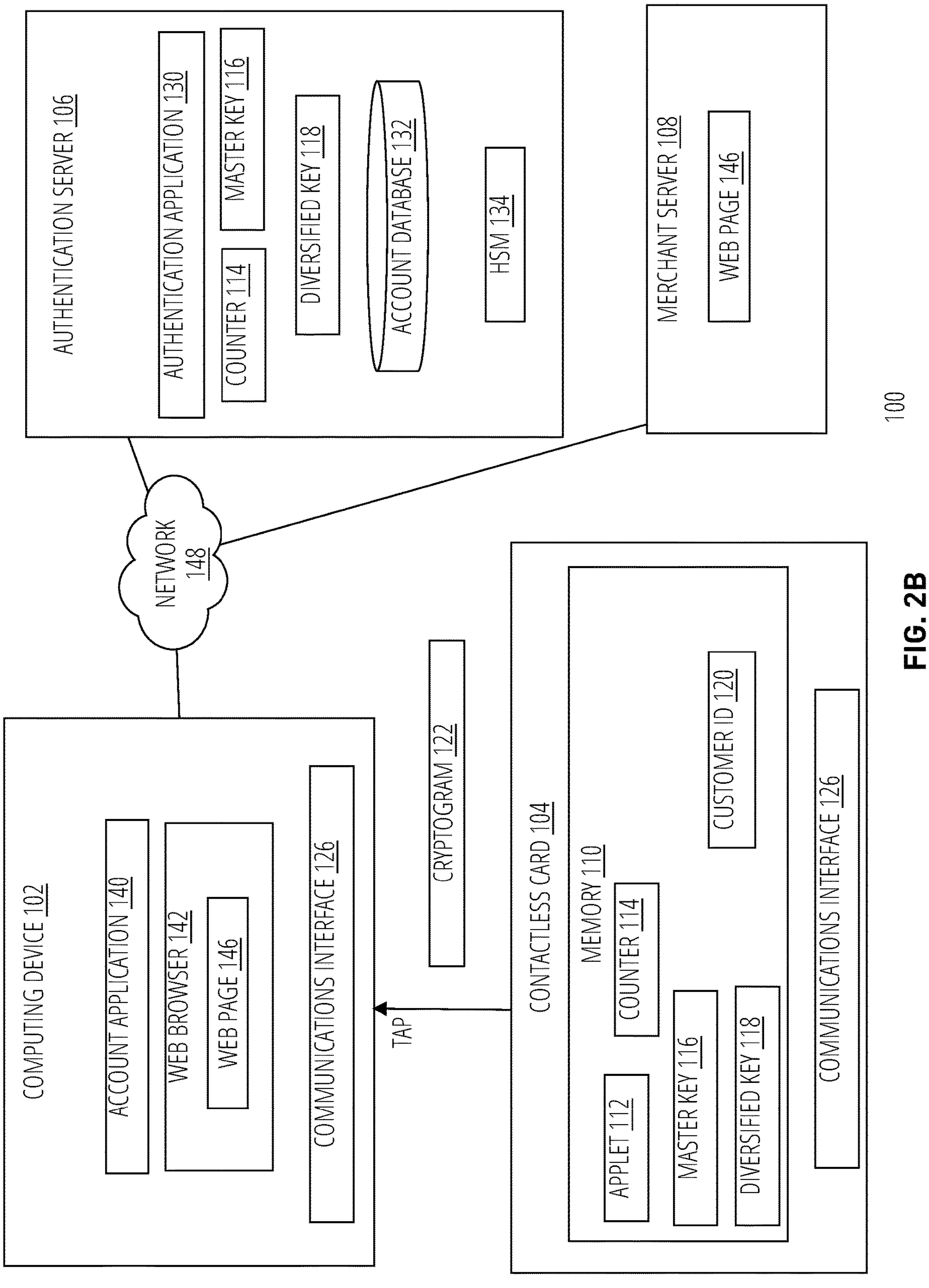
FIG. 2B illustrates an aspect of the subject matter in accordance with one embodiment.

FIG. 2B depicts an embodiment where the OS has accessed the URI 202 and the account application 140 has loaded the account authentication page. Generally, the account authentication page allows users to authenticate their account, e.g., via a login and password, biometrics, or a one-tap authentication based on a cryptogram 122 generated by the contactless card 104.

In the embodiment depicted in FIG. 2B, the user may tap the contactless card 104 to the computing device 102 (or otherwise bring the contactless card 104 within communications range of the communications interface 126 of the device 102). The applet 112 of the contactless card 104 may then generate another cryptogram 122 as described above. The account application 140 may then read the another cryptogram 122 via the communications interface 126.

Figure 2C:
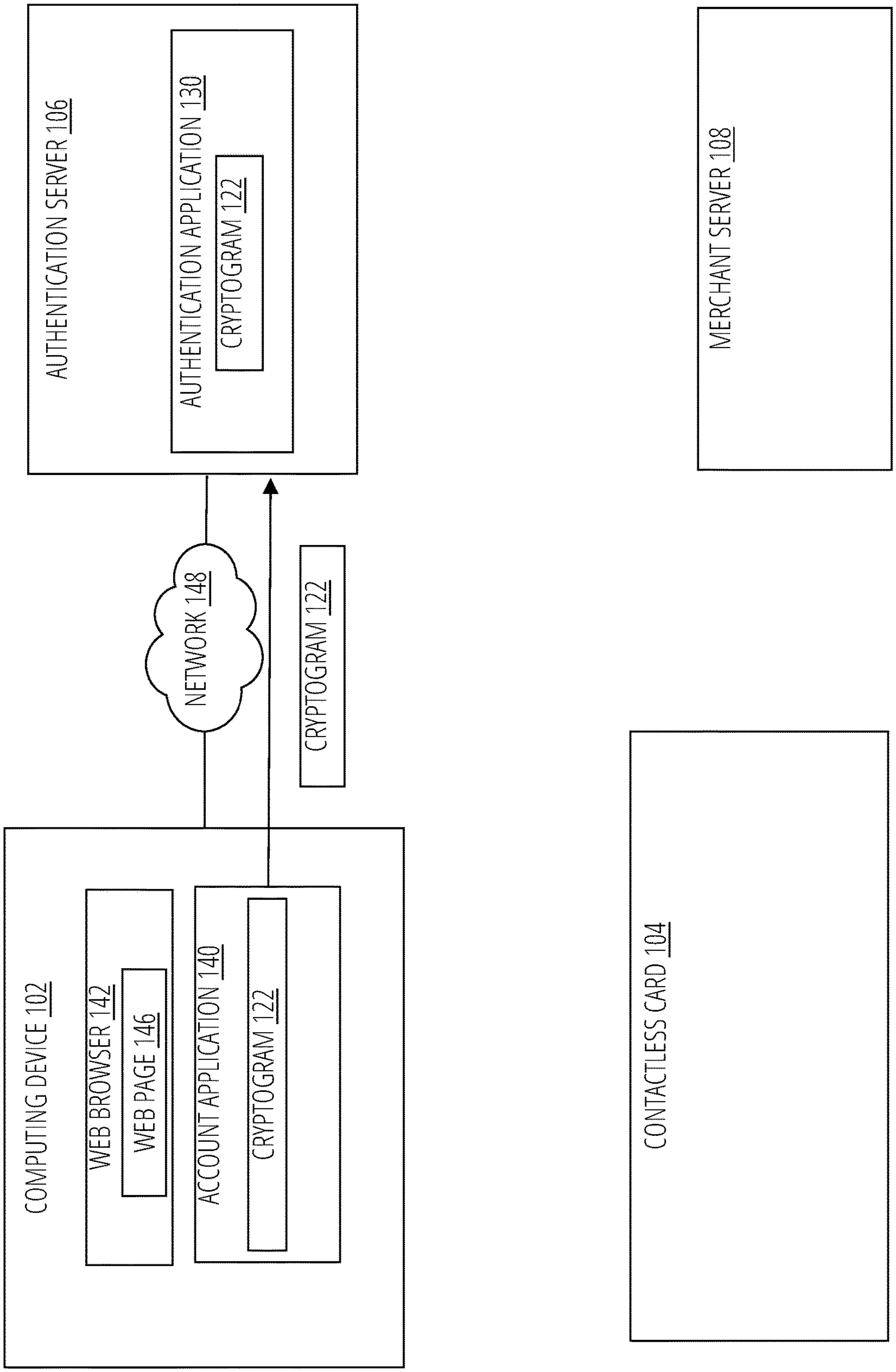
FIG. 2C illustrates an aspect of the subject matter in accordance with one embodiment.

FIG. 2C depicts an embodiment where the account application 140 transmits the data package including the another cryptogram 122 to the authentication server 106. The authentication server 106 may verify or otherwise authenticate the cryptogram 122 as described above.

Based on the successful decryption, the authentication application 130 may transmit another decryption result to the account application 140. As stated, the decryption result may include data to be autofilled into the payment forms to pay for a purchase with the merchant server 108.

Figure 2D:
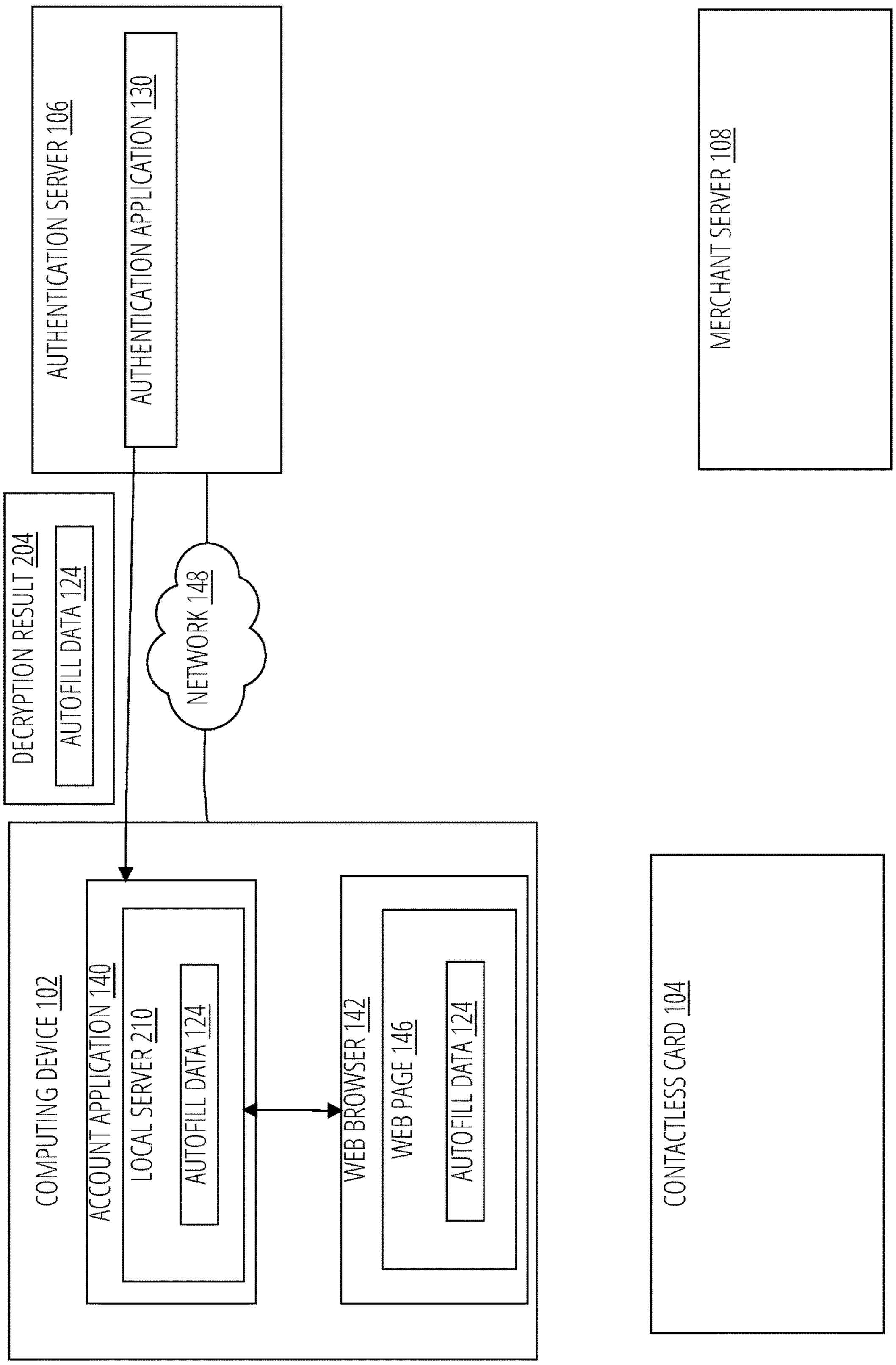
FIG. 2D illustrates an aspect of the subject matter in accordance with one embodiment.

FIG. 2D depicts an embodiment where the authentication application 130 transmits a decryption result 204 to the account application 140. In the example depicted in FIG. 2D, the decryption result 204 may indicate the authentication server 106 decrypted the another cryptogram 122 of FIGS. 2B-2C. Doing so may allow the account application 140 to determine that the another cryptogram 122 was successfully decrypted prior to continuing the autofill process, thereby improving security.

As shown, the authentication server 106 may further transmit the autofill data 124 to the account application 140. Although depicted as being transmitted with the decryption result 204, the autofill data 124 may be transmitted separate from the decryption result 204. Furthermore, in some embodiments, the autofill data 124 may be transmitted responsive to another tap of the contactless card 104 to the computing device 102, which causes another cryptogram to be generated and verified by the authentication server 106. In other embodiments, the autofill data 124 is received directly from the contactless card 104. In other embodiments, the account application 140 retrieves the autofill data 124 in a local database stored on the computing device 102. The autofill data 124 may generally include an account number of the contactless card 104, an expiration date of the contactless card 104, a CVV of the contactless card 104, a customer name associated with the contactless card 104, and a customer billing address associated with the contactless card 104. In some embodiments, the account number may be a one-time use virtual account number associated with the contactless card 104.

As shown, responsive to receiving the decryption result 204, the account application 140 may launch a local server 210. The local server 210 may be any type of server, such as a TCP/IP server, HTTP server, Hypertext Transfer Protocol Secure (HTTPS) server, a streaming server, and the like. However, only local applications (e.g., applications executing on the computing device 102) may access the local server 210. The OS may restrict attempts to access the local server 210 from external sources (e.g., via the network 148). The account application 140 may initiate the local server 210 on a specific port number. The account application 140 may select the port according to any feasible selection scheme, such as randomly generating port numbers, using a predetermined port number, and the like. The use of a local server to exchange data is described in greater detail in U.S. patent application Ser. No. 16/876,473, filed May 18, 2020, and application Ser. No. 16/876,549, filed May 18, 2020. The aforementioned patent applications are incorporated by reference herein in their entirety.

The account application 140 may cause the web browser 142 to establish a connection with the local server 210. In some embodiments, the account application 140 may generate a URI directed to the web browser 142, and include the relevant parameters needed to establish the connection with the local server 210 (e.g., IP address, username, password, port, etc.). The OS may access the URI, which launches the web browser 142 and provides the parameters to the web browser 142. The web browser 142, which still maintains the browsing session with the merchant server 108, may then connect to the local server 210, and receive the autofill data 124 from the local server 210.

Advantageously, once received from the local server 210, the web browser 142 may autofill the autofill data 124 into the one or more payment fields of the web page 146, e.g., to pay for the orange and apple. In some embodiments, the web browser 142 uses JavaScript® to autofill the autofill data 124 to the form fields, e.g., an autofill service provided by the web browser 142. In some embodiments, the web browser 142 uses an autofill service provided by the operating system 138 to autofill the autofill data 124 to the form fields. Regardless of the autofill service used, the user may submit the form including the autofilled data to complete the purchase via the web browser 142.

In some embodiments, the authentication server 106 may generate a payment token as the autofill data 124. In such embodiments, the authentication server 106 may provide the payment token to the merchant server 108 and/or the computing device 102. In such embodiments, the account application 140 may receive the payment token from the authentication server 106 or the merchant server 108. The payment token may be provided by the account application 140 to the local server 210, which provides the token to the web browser 142. The payment token may be used to process the purchase via the web browser 142.

In some embodiments, the account application 140 may provide the autofill data 124 to the content provider service of the operating system 138 rather than initiating the local server 210. In such embodiments, the web browser 142 and/or the web page 146 may receive the autofill data 124 from the content provider service. The web browser 142 may then autofill the autofill data 124 into the form fields using the autofill service of the web browser 142 and/or the autofill service of the operating system 138.

Figure 2E:
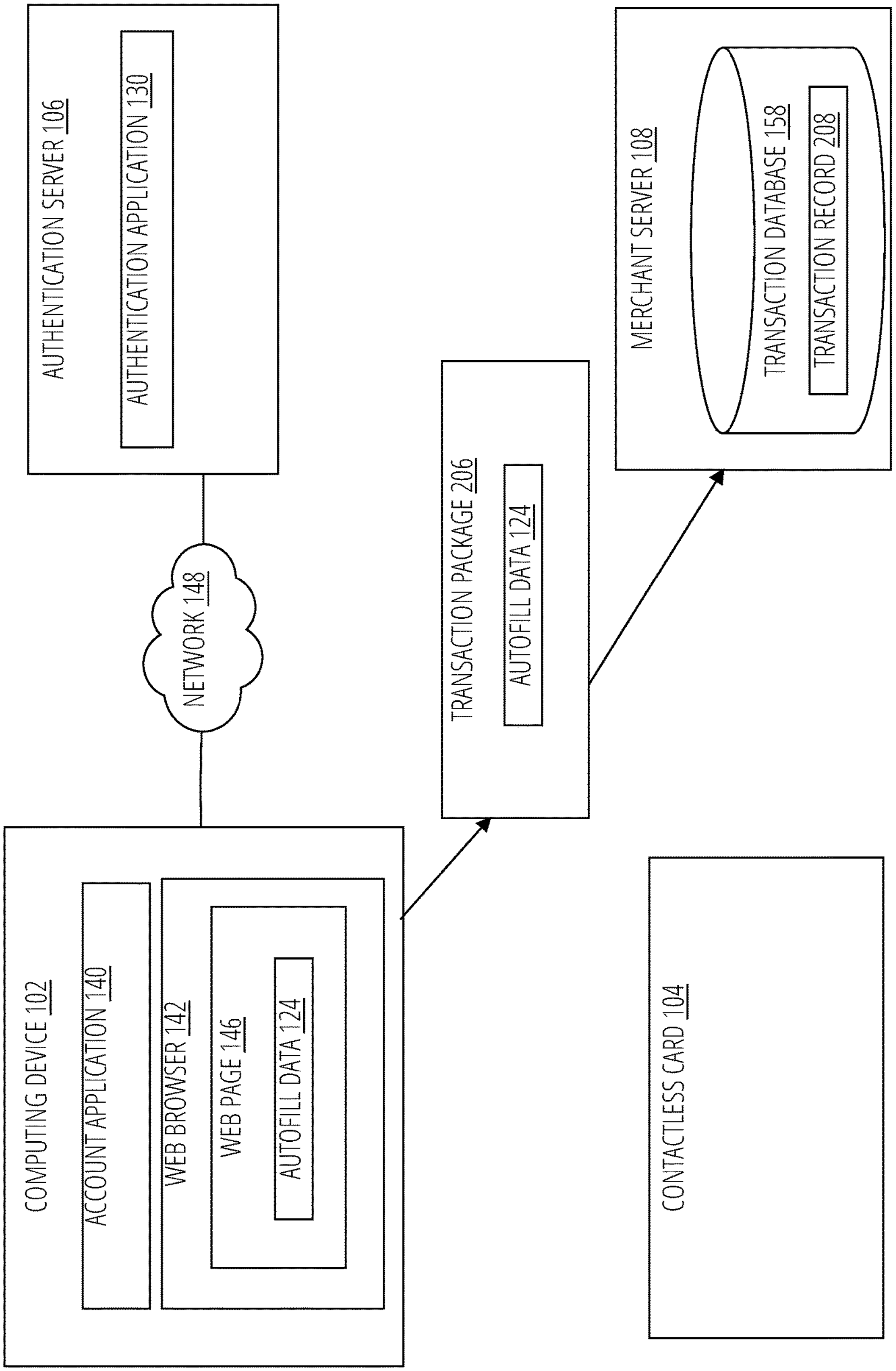
FIG. 2E illustrates an aspect of the subject matter in accordance with one embodiment.

FIG. 2E depicts an embodiment where the web browser 142 generates a transaction package 206 to process a payment for the apple and the orange using the autofill data 124 filled into the form fields of the web page 146. Generally, the transaction package 206 may be transmitted according to the hypertext transfer protocol (HTTP). Once received, the merchant server 108 may process payment for the transaction using the autofill data 124. The merchant server 108 may then create a transaction record 208 for the transaction in a transaction database 158. As stated, however, in some embodiments, the payment token is used instead of the autofill data 124 to pay for the transaction.

Figure 3B:
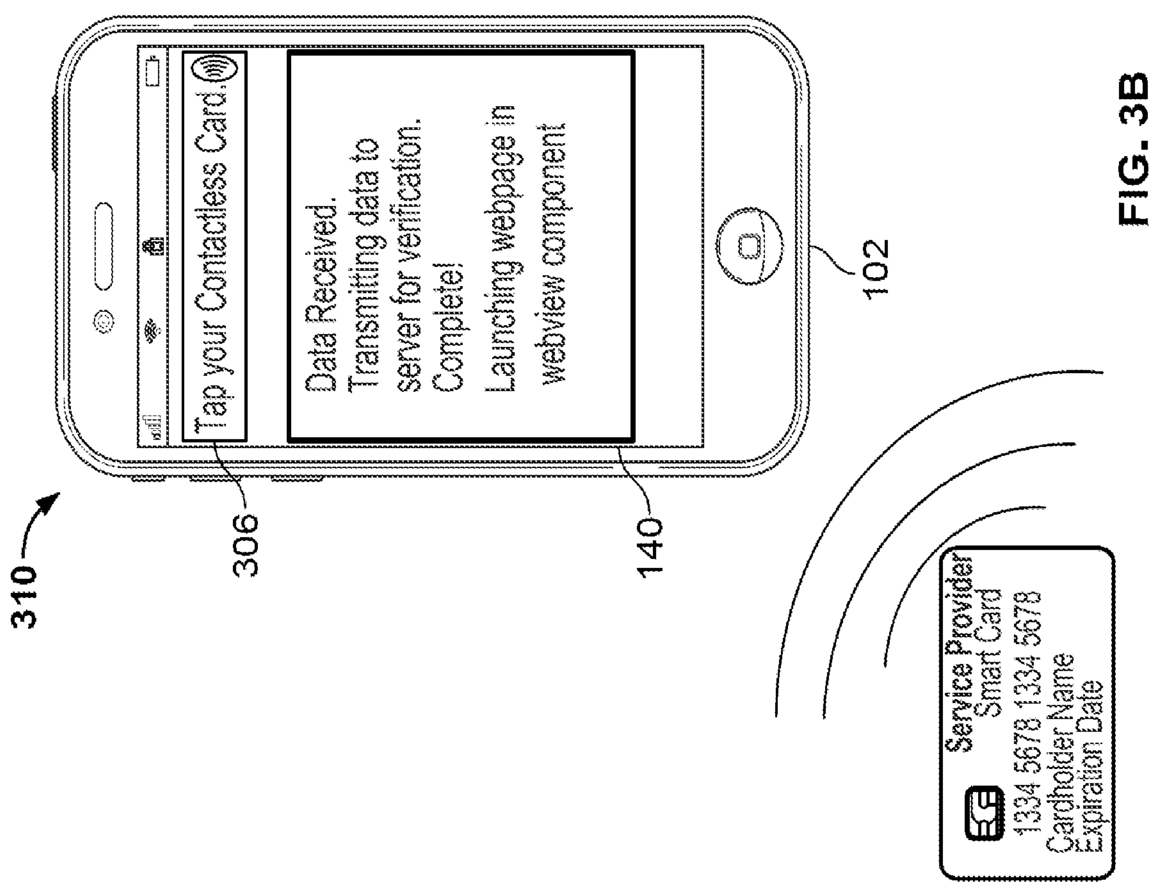
FIG. 3B illustrates an aspect of the subject matter in accordance with one embodiment.
Figure 3A:
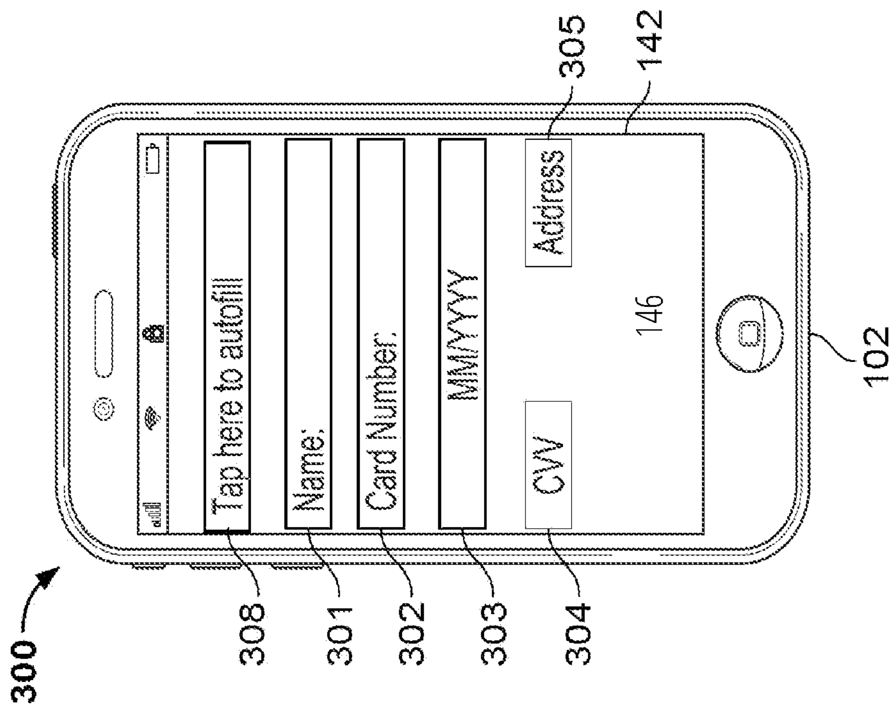
FIG. 3A illustrates an aspect of the subject matter in accordance with one embodiment.

FIG. 3A is a schematic 300 depicting an example embodiment of autofilling data into a web browser using a contactless card. As shown, FIG. 3A includes a mobile computing device 102 executing a web browser 142. The web browser 142 may display a web page, such as the web page 146. For example, the web page 146 may be a web page 146 that allows a user to place an order and provide payment information for the order. As shown, the web page 146 includes a payment form having fields 301-305, where field 301 is a name field, field 302 is an account number field, field 303 is an expiration date field, field 304 is a CVV field, and field 305 is an address field.

The web page 146 further includes a selectable element 308 that allows the user to initiate the autofill process to autofill payment information into the form fields 301-305. Although discussed with reference to the WebView example, FIGS. 3A-3D are equally applicable to the local server example. Embodiments are not limited in this context.

FIG. 3B is a schematic 310 illustrating an embodiment where the user has selected the element 308 to initiate the autofill process. Generally, doing so may cause the web browser 142 to generate a URI directed to the account application 140, which causes the computing device 102 to display the account application 140. Based on the parameters of the URI, the account application 140 outputs an authentication page that requests the user tap their contactless card 104 to the computing device 102 as indicated by the notification 306. Doing so causes the contactless card 104 to generate a cryptogram that is verified by the authentication server 106. As shown, the authentication server 106 verifies the cryptogram in FIG. 3B. Doing so may cause the authentication server 106 to transmit payment information (e.g., account number, expiration date, CVV) to the account application 140. The authentication server 106 may further provide the account holder's name and address if the account application 140 does not have these values stored locally.

Figure 3D:
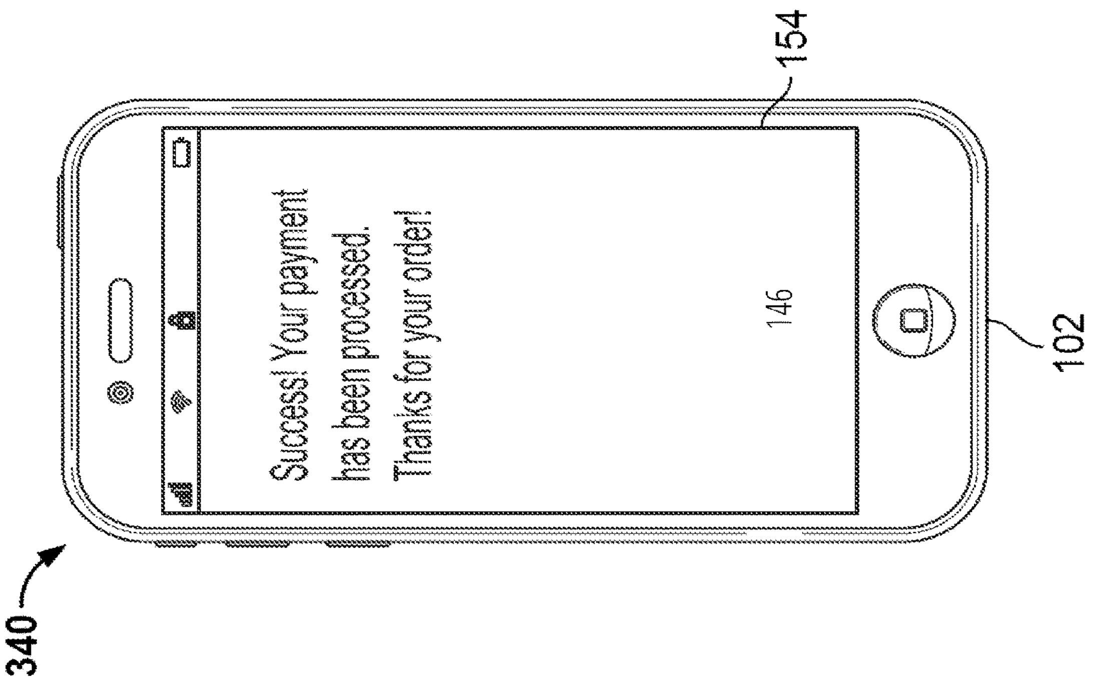
FIG. 3D illustrates an aspect of the subject matter in accordance with one embodiment.
Figure 3C:
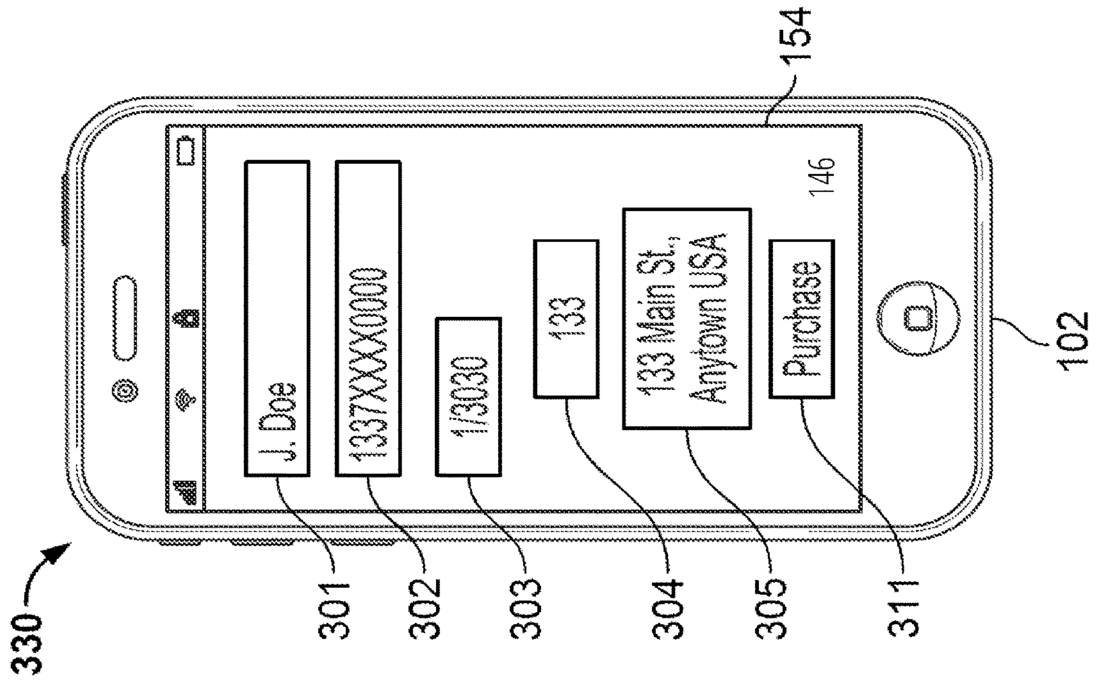
FIG. 3C illustrates an aspect of the subject matter in accordance with one embodiment.

FIG. 3C is a schematic 320 depicting an embodiment where the account application 140 receives an indication from the authentication server 106 specifying the server verified the cryptogram generated by the contactless card 104. As stated, the authentication server 106 may include the payment information to autofill in the form fields 301-306. In response, the account application 140 launches the WebView component 154. The WebView component 154 uses a URL generated by the account application 140 to replicate the browsing session of FIG. 3A in the WebView component 154, e.g., based on the merchant ID and session ID of the URI generated in FIG. 3A.

As shown, the WebView component 154 may autofill the payment information and any personally identifiable information into the form fields. More specifically, the WebView component 154 may autofill the user's name to the name field 301, the account number to the account number field 302, the expiration date to the expiration date field 303, the CVV to the CVV field 304, and the address to the address field 305. The user may then complete the purchase using the button 311, which causes the merchant server 108 to process the payment using the autofilled data.

FIG. 3D is a schematic 330 illustrating a confirmation page in the WebView component 154. The confirmation page generally reflects that the purchase was completed using the data autofilled into the form fields 301-305. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
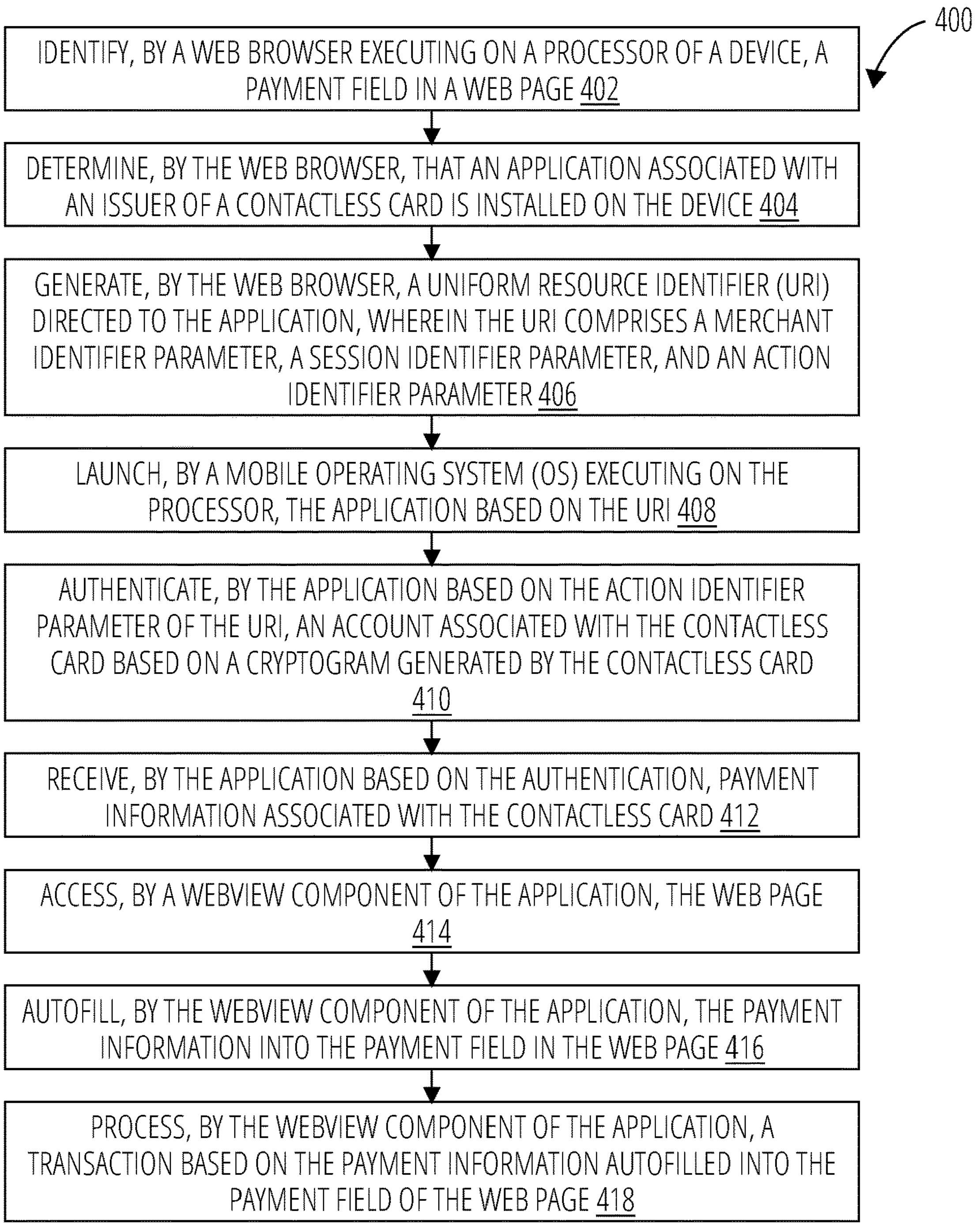
FIG. 4 illustrates a routine 400 in accordance with one embodiment.

FIG. 4 illustrates an embodiment of a logic flow 400. The logic flow 400 may be representative of some or all of the operations executed by one or more embodiments described herein. For example, the logic flow 400 may include some or all of the operations to autofill data using the WebView component 154. Embodiments are not limited in this context.

In block 402, routine 400 identifies, by a web browser 142 executing on a processor of a computing device 102, a payment field in a web page 146. The payment field may be one of multiple payment fields of a form. In block 404, routine 400 determines, by the web browser 142, that an account application 140 associated with an issuer of a contactless card 104 is installed on the computing device 102. The web browser 142 may use one or more functions provided by the operating system 138 to determine that the account application 140 is installed. In block 406, routine 400 generates, by the web browser 142, a uniform resource identifier (URI) directed to the account application 140, wherein the URI comprises a merchant identifier parameter, a session identifier parameter, and an action identifier parameter.

In block 408, routine 400 launches, by an OS executing on the processor, the account application 140 based on the URI. In block 410, routine 400 authenticates, by the account application 140 based on the action identifier parameter of the URI, an account associated with the contactless card based on a cryptogram generated by the contactless card 104. In block 412, routine 400 receives, by the account application 140 based on the authentication, payment information associated with the contactless card 104. The payment information may include an account number, expiration date, and a CVV of the contactless card 104. The payment information may further include an account holder name and/or address. In block 414, routine 400 accesses, by a WebView component 154 of the account application 140, the web page 146. The merchant server 108 may then transmit all data associated with the user's browsing session and the web page 146 to the WebView component 154. Doing so replicates or otherwise restores the user's browsing session from the web browser 142 in the WebView component 154. In block 416, the WebView component 154 autofills the payment information into the payment field in the web page 146. If multiple fields are present, the WebView component 154 may autofill the information into the appropriate fields. In block 418, routine 400 processes, by the WebView component 154, a transaction based on the payment information autofilled into the payment field of the web page.

Figure 5:
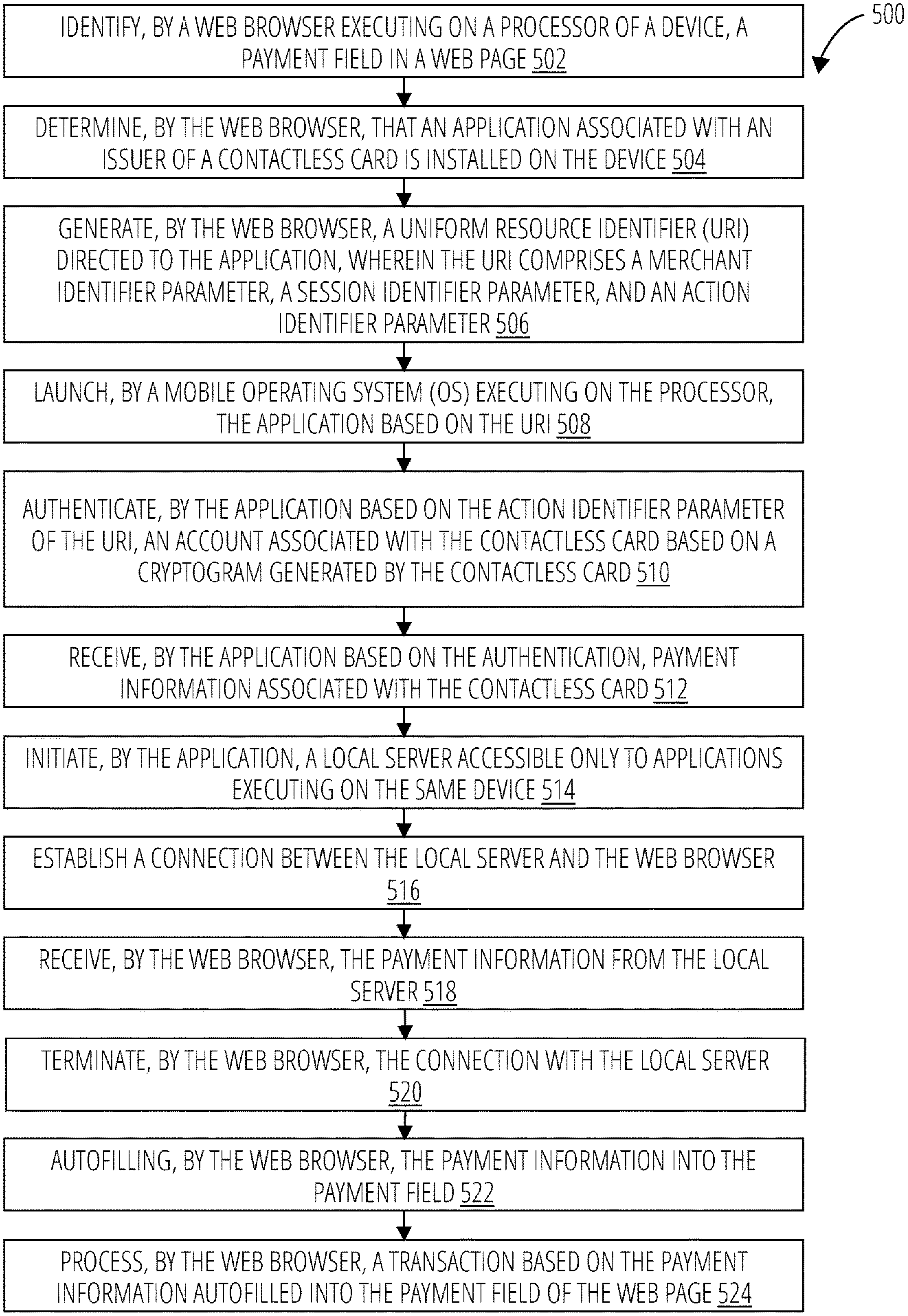
FIG. 5 illustrates a routine 500 in accordance with one embodiment.

FIG. 5 illustrates an embodiment of a logic flow 500. The logic flow 500 may be representative of some or all of the operations executed by one or more embodiments described herein. For example, the logic flow 500 may include some or all of the operations to autofill data using the local server 210. Embodiments are not limited in this context.

In block 502, routine 500 identifies, by a web browser 142 executing on a processor of a device, a payment field in a web page 146. The payment field may be one of multiple payment fields of a form. In block 504, routine 500 determines, by the web browser 142, that an account application 140 associated with an issuer of a contactless card 104 is installed on the device. The web browser 142 may use one or more functions provided by the operating system 138 to determine that the account application 140 is installed. In block 506, routine 500 generates, by the web browser 142, a uniform resource identifier (URI) directed to the account application 140, wherein the URI comprises a merchant identifier parameter, a session identifier parameter, and an action identifier parameter.

In block 508, routine 500 launches, by a mobile operating system (OS) executing on the processor, the account application 140 based on the URI. In block 510, routine 500 authenticates, by the account application 140 based on the action identifier parameter of the URI, an account associated with the contactless card 104 based on a cryptogram generated by the contactless card. In block 512, routine 500 receives, by the account application 140 based on the authentication, payment information associated with the contactless card 104. In block 514, routine 500 initiates, by the account application 140, a local server 210 accessible only to applications executing on the computing device 102.

In block 516, routine 500 establishes a connection between the local server 210 and the web browser 142. In block 518, routine 500 receives, by the web browser 142, the payment information from the local server 210. In block 520, routine 500 terminates, by the web browser 142, the connection with the local server by issuing a termination command to the local server 210. In block 522, routine 500 autofills, by the web browser 142, the payment information into the payment field. If multiple fields are present, the web browser 142 may autofill the information into the appropriate fields. In block 524, routine 500 processes, by the web browser 142, a transaction based on the payment information autofilled into the payment field of the web page 146.

Figure 6A:
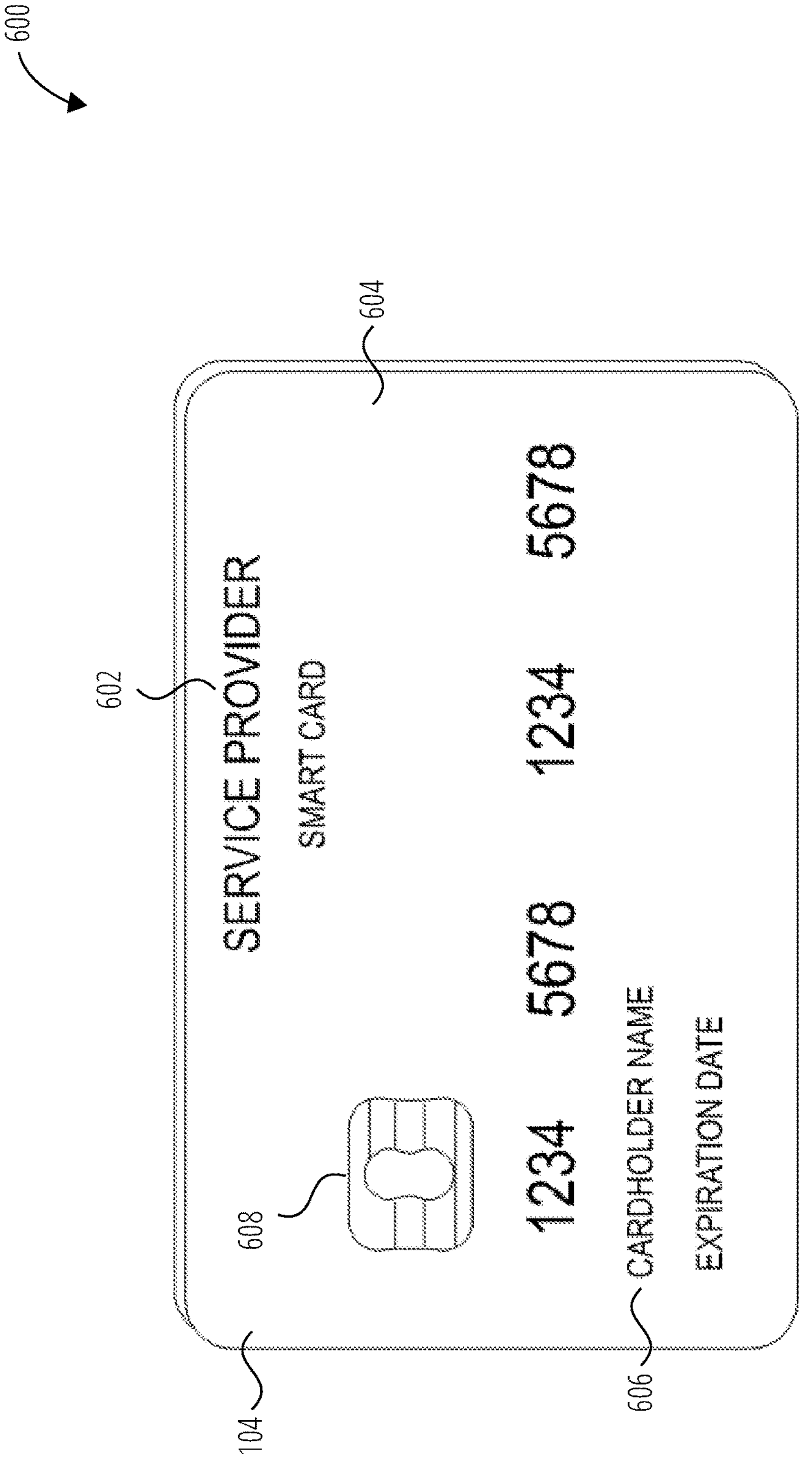
FIG. 6A illustrates a contactless card in accordance with one embodiment.

FIG. 6A is a schematic 600 illustrating an example configuration of a contactless card 104, which may include a payment card, such as a credit card, debit card, or gift card, issued by a service provider as displayed as service provider indicia 602 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 604, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

The contactless card 104 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as the ISO/IEC 7816 standard, and enable communication in accordance with the EMV protocol. The contactless card 104 may also include processing circuitry, antenna and other components as will be further discussed in FIG. 6B. These components may be located behind the contact pad 608 or elsewhere on the substrate 604, e.g. within a different layer of the substrate 604, and may electrically and physically be coupled with the contact pad 608. The contactless card 104 may also include a magnetic strip or tape, which may be located on the back of the card (not shown in FIG. 6A). The contactless card 104 may also include a Near-Field Communication (NFC) device coupled with an antenna capable of communicating via the NFC protocol. Embodiments are not limited in this manner.

Figure 6B:
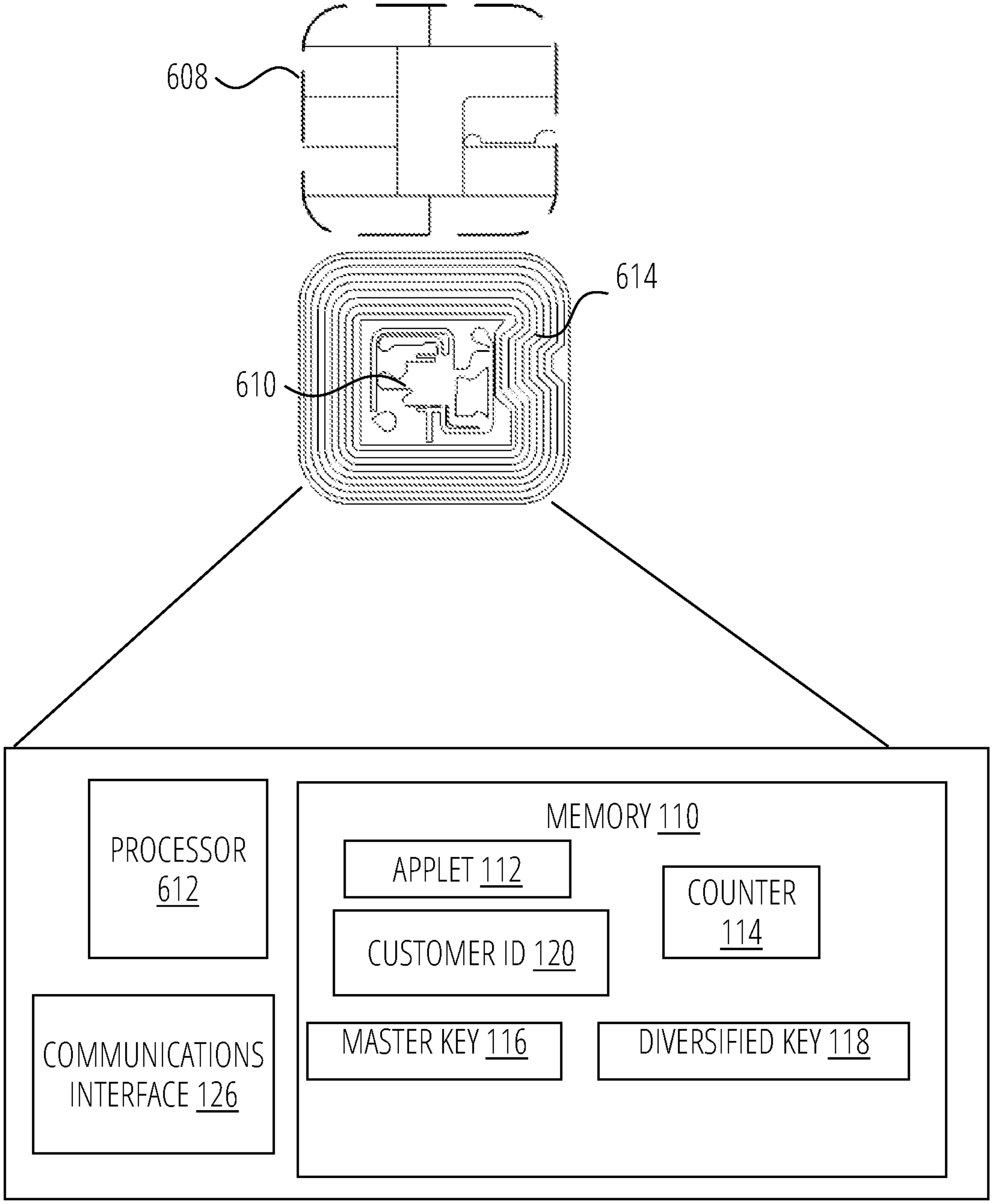
FIG. 6B illustrates a contactless card 104 in accordance with one embodiment.

As illustrated in FIG. 6B, the contact pad 608 of contactless card 104 may include processing circuitry 610 for storing, processing, and communicating information, including a processor 612, a memory 110, and one or more communications interface 126. It is understood that the processing circuitry 610 may contain additional components, including processors, memories, error and parity/CRC checkers, data encoders, anticollision algorithms, controllers, command decoders, security primitives and tamper proofing hardware, as necessary to perform the functions described herein.

The memory 110 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 110 may be encrypted memory utilizing an encryption algorithm executed by the processor 612 to encrypted data.

The memory 110 may be configured to store one or more applet 112, one or more counters 114, a customer ID 120, one or more master keys 116, and one or more diversified keys 118. The one or more applet 112 may comprise one or more software applications configured to execute on one or more contactless cards 104, such as a Java® Card applet. However, it is understood that the one or more applet 112 are not limited to Java Card applets, and instead may be any software application operable on contactless cards or other devices having limited memory. The one or more counter 114 may comprise a numeric counter sufficient to store an integer. The customer ID 120 may comprise a unique alphanumeric identifier assigned to a user of the contactless card 104, and the identifier may distinguish the user of the contactless card 104 from other users of other contactless cards 104. In some examples, the customer ID 120 may identify both a customer and an account assigned to that customer and may further identify the contactless card 104 associated with the customer's account.

The processor 612 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 612 and memory 110 elements located within the contact pad 608.

In some examples, the contactless card 104 may comprise one or more antenna(s) 614. The one or more antenna(s) 614 may be placed within the contactless card 104 and around the processing circuitry 610 of the contact pad 608. For example, the one or more antenna(s) 614 may be integral with the processing circuitry 610 and the one or more antenna(s) 614 may be used with an external booster coil. As another example, the one or more antenna(s) 614 may be external to the contact pad 608 and the processing circuitry 610.

In an embodiment, the coil of contactless card 104 may act as the secondary of an air core transformer. The terminal may communicate with the contactless card 104 by cutting power or amplitude modulation. The contactless card 104 may infer the data transmitted from the terminal using the gaps in the power connection of the contactless card 104, which may be functionally maintained through one or more capacitors. The contactless card 104 may communicate back by switching a load on the coil of the contactless card 104 or load modulation. Load modulation may be detected in the terminal's coil through interference. More generally, using the antenna(s) 614, processor 612, and/or the memory 110, the contactless card 104 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet 112 may be added to contactless cards to provide a one-time password (OTP) for multifactor authentication (MFA) in various mobile application-based use cases. Applet 112 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include the cryptogram 122, and any other data.

One example of an NDEF OTP is an NDEF short-record layout (SR=1). In such an example, one or more applet 112 may be configured to encode the OTP as an NDEF type 4 well known type text tag. In some examples, NDEF messages may comprise one or more records. The applet 112 may be configured to add one or more static tag records in addition to the OTP record.

In some examples, the one or more applet 112 may be configured to emulate an RFID tag. The RFID tag may include one or more polymorphic tags. In some examples, each time the tag is read, different cryptographic data is presented that may indicate the authenticity of the contactless card. Based on the one or more applet 112, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter 114 may be configured to increment. In some examples, each time data from the contactless card 104 is read (e.g., by a mobile device), the counter 114 is transmitted to the server for validation and determines whether the counter 114 is equal (as part of the validation) to a counter of the server.

The one or more counter 114 may be configured to prevent a replay attack. For example, if a cryptogram has been obtained and replayed, that cryptogram is immediately rejected if the counter 114 has been read or used or otherwise passed over. If the counter 114 has not been used, it may be replayed. In some examples, the counter that is incremented on the contactless card 104 is different from the counter that is incremented for transactions. The contactless card 104 is unable to determine the application transaction counter 114 since there is no communication between applets 112 on the contactless card 104. In some examples, the contactless card 104 may comprise a first applet 440-1, which may be a transaction applet, and a second applet 440-2. Each applet 440-1 and 440-2 may comprise a respective counter 114.

In some examples, the counter 114 may get out of sync. In some examples, to account for accidental reads that initiate transactions, such as reading at an angle, the counter 114 may increment but the application does not process the counter 114. In some examples, when the mobile device 10 is woken up, NFC may be enabled and the computing device 102 may be configured to read available tags, but no action is taken responsive to the reads.

To keep the counter 114 in sync, an application, such as a background application, may be executed that would be configured to detect when the computing device 102 wakes up and synchronizes with the server of a banking system indicating that a read that occurred due to detection to then move the counter 114 forward. In other examples, Hashed One Time Password may be utilized such that a window of mis-synchronization may be accepted. For example, if within a threshold of 10, the counter 114 may be configured to move forward. But if within a different threshold number, for example within 10 or 1000, a request for performing re-synchronization may be processed which requests via one or more applications that the user tap, gesture, or otherwise indicate one or more times via the user's device. If the counter 114 increases in the appropriate sequence, then it is possible to know that the user has done so.

The key diversification technique described herein with reference to the counter 114, master key, and diversified key, is one example of a key diversification technique using encryption and decryption. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. The triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 104 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
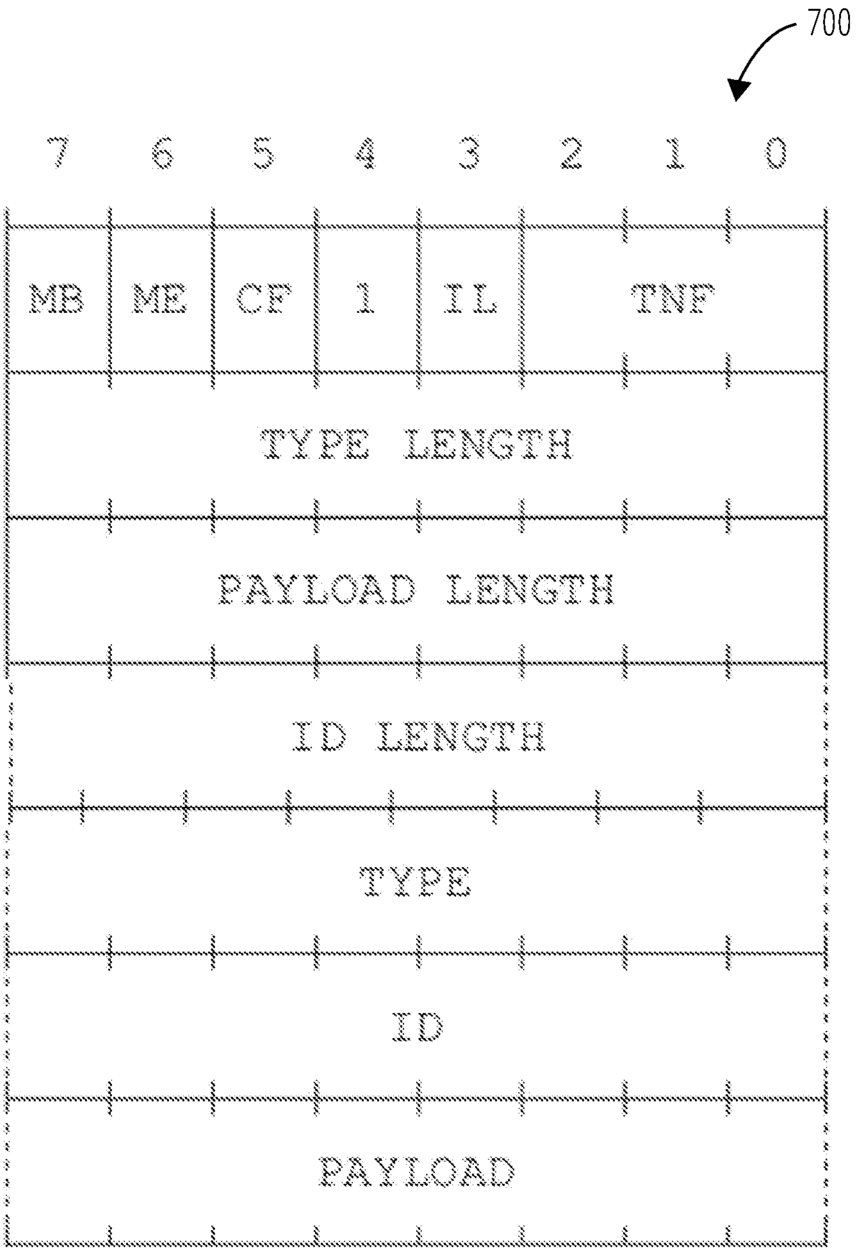
FIG. 7 illustrates a data structure 700 in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 700 may include the cryptogram 122, and any other data provided by the applet 112.

Figure 8:
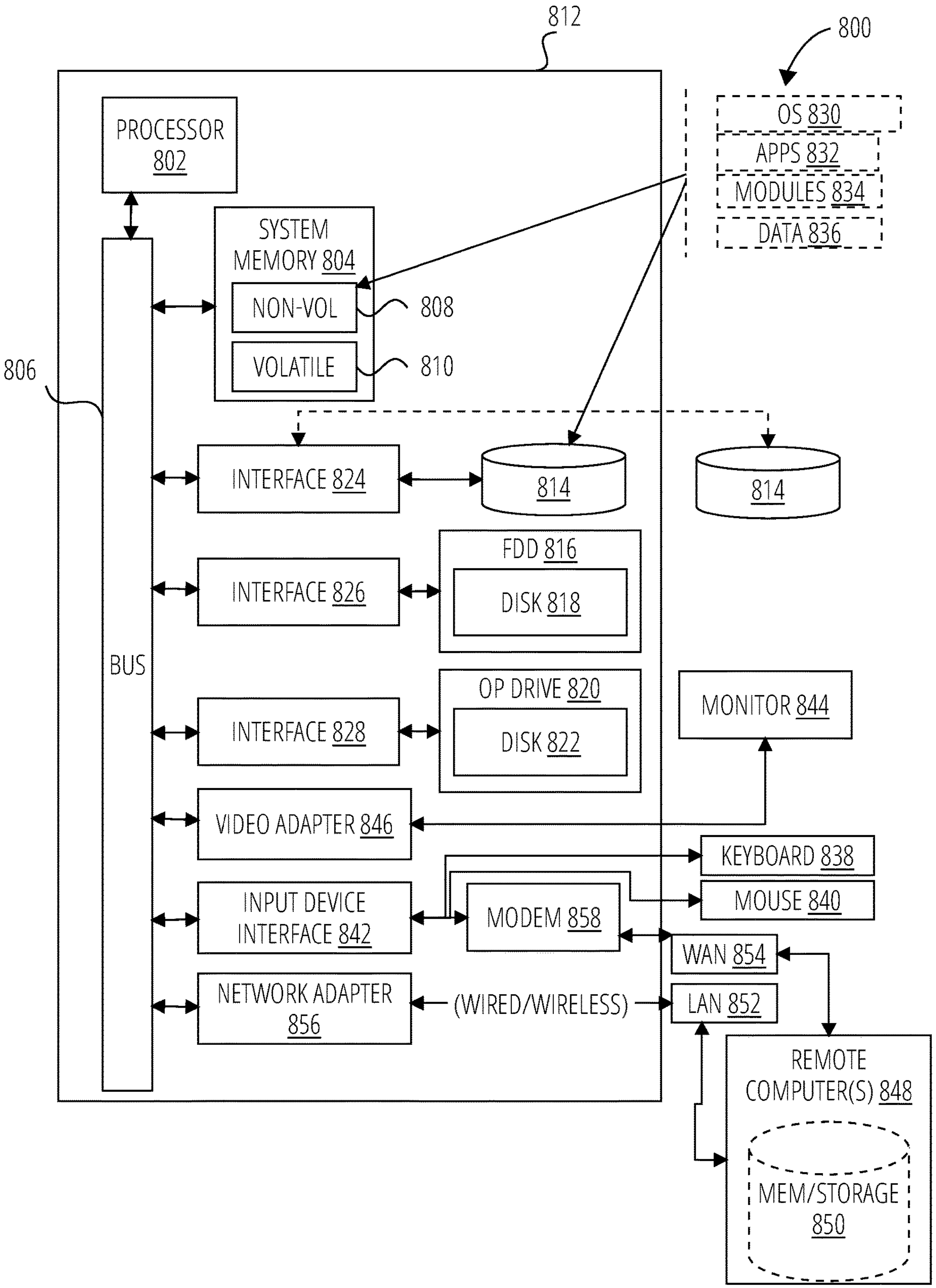
FIG. 8 illustrates a computer architecture 800 in accordance with one embodiment.

FIG. 8 illustrates an embodiment of an exemplary computer architecture 800 suitable for implementing various embodiments as previously described. In one embodiment, the computer architecture 800 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computer architecture 800 includes a computer 812 comprising a processor 802, a system memory 804 and a system bus 806. The processor 802 can be any of various commercially available processors. The computer 812 may be representative of the computing device 102 and/or the authentication server 106.

The system bus 806 provides an interface for system components including, but not limited to, the system memory 804 to the processor 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 812 may include various types of computer-readable storage media in the form of one or more lower speed memory units, including an internal (or external) hard disk drive 814, a magnetic disk drive 816 to read from or write to a removable magnetic disk 818, and an optical disk drive 820 to read from or write to a removable optical disk 822 (e.g., a CD-ROM or DVD). The hard disk drive 814, magnetic disk drive 816 and optical disk drive 820 can be connected to system bus 806 the by an HDD interface 824, and FDD interface 826 and an optical disk drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 830, one or more applications 832, other program modules 834, and program data 836. In one embodiment, the one or more applications 832, other program modules 834, and program data 836 can include, for example, the various applications and/or components of the system 100.

A user can enter commands and information into the computer 812 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 802 through an input device interface 842 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 812. In addition to the monitor 844, a computer typically includes other peripheral output devices, such as speakers, printers, and so forth.

The computer 812 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 812, although, for purposes of brevity, only a memory and/or storage device 850 is illustrated. The logical connections depicted include wire/wireless connectivity to a local area network 852 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 852 networking environment, the computer 812 is connected to the local area network 852 through a wire and/or wireless communication network interface or network adapter 856. The network adapter 856 can facilitate wire and/or wireless communications to the local area network 852, which may also include a wireless access point disposed thereon for communicating with the wireless functionality of the network adapter 856.

When used in a wide area network 854 networking environment, the computer 812 can include a modem 858, or is connected to a communications server on the wide area network 854 or has other means for establishing communications over the wide area network 854, such as by way of the Internet. The modem 858, which can be internal or external and a wire and/or wireless device, connects to the system bus 806 via the input device interface 842. In a networked environment, program modules depicted relative to the computer 812, or portions thereof, can be stored in the remote memory and/or storage device 850. It will be appreciated that the network connections shown are exemplary and other means of establishing a communications link between the computers can be used.

The computer 812 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

identifying, by a web browser executing on a processor of a device, a payment field in a web page loaded in the web browser;

determining, by the web browser, that an account application associated with an issuer of a contactless card is installed on the device;

generating, by the web browser, based on the determination that the account application is installed on the device, a uniform resource identifier (URI) directed to the account application, wherein the URI comprises a merchant identifier parameter, a session identifier parameter, and an action identifier parameter, wherein the URI is a deep link to an authentication page of the account application;

launching, by a mobile operating system (OS) executing on the processor, the account application based on the URI, wherein the action identifier parameter triggers the launch of the account application;

authenticating, by the account application based on the action identifier parameter of the URI, an account associated with the contactless card based on decrypting encrypted data generated by and received from the contactless card when the contactless card is within a communications range of a communications interface of the device;

receiving, by the account application based on the authentication, a decryption result based on decrypting the encrypted data, the decryption result including payment information associated with the contactless card;

accessing, by a Web View component of the account application, the web page loaded in the Web View component of the account application;

autofilling, by the Web View component of the account application, the payment information into the payment field in the web page loaded in the Web View component of the account application; and processing, by the Web View component of the account application, a transaction based on the payment information autofilled into the payment field of the web page loaded in the Web View component of the account application.

2. The method of claim 1, further comprising:

generating, by the account application, a URL of the web page based on the merchant identifier and the session identifier, wherein the merchant identifier is associated with a merchant providing the web page, wherein the session identifier is associated with a browsing session in the web browser; and accessing, by the Web View component of the account application, the web page based on the generated URL of the web page.

3. The method of claim 1, wherein the payment information comprises an account number received from an authentication server or a payment token received from a web server hosting the web page.

4. The method of claim 1, wherein the web browser determines the account application is installed on the device based on a function provided by the mobile operating system.

5. The method of claim 1, wherein the account application loads the authentication page of the account application based on the action identifier.

6. The method of claim 1, wherein the authenticating comprises:

transmitting, by the account application, the encrypted data to an authentication server, wherein the encrypted data is generated using a diversified key formed from an encryption algorithm and a master key stored in the contactless card; and receiving, by the account application from the authentication server, an indication specifying the authentication server decrypted the encrypted data.

7. The method of claim 1, further comprising prior to determining that the account application is installed on the device:

receiving, by the web browser, input selecting the payment field of the web page;

displaying an indication specifying to process the transaction using the account application; and receiving input specifying to process the transaction using the account application.

8. A non-transitory computer-readable storage medium, the computer-readable storage medium including instructions that when executed by a processor of a device, cause the processor to:

identify, by a web browser, a payment field in a web page loaded in the web browser;

determine, by the web browser, that an account application associated with an issuer of a contactless card is installed on the device;

generate, by the web browser, based on the determination that the account application is installed on the device, a uniform resource identifier (URI) directed to the account application, wherein the URI comprises a merchant identifier parameter, a session identifier parameter, and an action identifier parameter, wherein the URI is a deep link to an authentication page of the account application;

launch, by a mobile operating system (OS) executing on the processor, the account application based on the URI, wherein the action identifier parameter triggers the launch of the account application;

authenticate, by the account application based on the action identifier parameter of the URI, an account associated with the contactless card based on encrypted data generated by and received from the contactless card when the contactless card is within a communications range of a communications interface of the device;

receive, by the account application based on the authentication, a decryption result based on decrypting the encrypted data, the decryption result including payment information associated with the contactless card;

access, by a Web View component of the account application, the web page loaded in the Web View component of the account application;

autofill, by the Web View component of the account application, the payment information into the payment field in the web page loaded in the Web View component of the account application; and process, by the Web View component of the account application, a transaction based on the payment information autofilled into the payment field of the web page loaded in the Web View component of the account application.

9. The non-transitory computer-readable storage medium of claim 8, wherein the instructions further cause the processor to:

generate, by the account application, a URL of the web page based on the merchant identifier and the session identifier, wherein the merchant identifier is associated with a merchant providing the web page, wherein the session identifier is associated with a browsing session in the web browser; and access, by the Web View component of the account application, the web page based on the generated URL of the web page.

10. The non-transitory computer-readable storage medium of claim 8, wherein the payment information comprises an account number received from an authentication server or a payment token received from a web server host the web page.

11. The non-transitory computer-readable storage medium of claim 8, wherein the web browser determines the account application is installed on the device based on a function provided by the mobile operating system.

12. The non-transitory computer-readable storage medium of claim 8, wherein the account application loads the authentication page of the account application based on the action identifier.

13. The non-transitory computer-readable storage medium of claim 8, wherein the authenticating comprises instructions that when executed by the processor cause the processor to:

transmit, by the account application, the encrypted data to an authentication server, wherein the encrypted data is generated using a diversified key formed from an encryption algorithm and a master key stored in the contactless card; and receive, by the account application from the authentication server, an indication specifying the authentication server decrypted the encrypted data.

14. The non-transitory computer-readable storage medium of claim 8, wherein the instructions further cause the processor to, prior to determining that the account application is installed on the device:

receive, by the web browser, input selecting the payment field of the web page;

display an indication specifying to process the transaction using the account application; and receive input specifying to process the transaction using the account application.

15. A computing apparatus comprising:

a processor; and a memory storing instructions that, when executed by the processor, cause the processor to:

identify, by a web browser, a payment field in a web page loaded in the web browser;

determine, by the web browser, that an account application associated with an issuer of a contactless card is installed on the apparatus;

generate, by the web browser, based on the determination that the account application is installed on the device, a uniform resource identifier (URI) directed to the account application, wherein the URI comprises a merchant identifier parameter, a session identifier parameter, and an action identifier parameter, wherein the URI is a deep link to an authentication page of the account application;

launch, by a mobile operating system (OS) executing on the processor, the account application based on the URI, wherein the action identifier parameter triggers the launch of the account application;

authenticate, by the account application based on the action identifier parameter of the URI, an account associated with the contactless card based on encrypted data generated by and received from the contactless card when the contactless card is within a communications range of a communications interface of the apparatus;

receive, by the account application based on the authentication, a decryption result based on decrypting the encrypted data, the decryption result including payment information associated with the contactless card;

access, by a Web View component of the account application, the web page loaded in the Web View component of the account application;

autofill, by the Web View component of the account application, the payment information into the payment field in the web page loaded in the Web View component of the account application; and process, by the Web View component of the account application, a transaction based on the payment information autofilled into the payment field of the web page loaded in the Web View component of the account application.

16. The computing apparatus of claim 15, wherein the instructions further configure the apparatus to:

generate, by the account application, a URL of the web page based on the merchant identifier and the session identifier, wherein the merchant identifier is associated with a merchant providing the web page, wherein the session identifier is associated with a browsing session in the web browser; and access, by the Web View component of the account application, the web page based on the generated URL of the web page.

17. The computing apparatus of claim 15, wherein the payment information comprises an account number received from an authentication server or a payment token received from a web server host the web page.

18. The computing apparatus of claim 15, wherein the web browser determines the account application is installed on the apparatus based on a function provided by the mobile operating system.

19. The computing apparatus of claim 15, wherein the account application loads the authentication page of the account application based on the action identifier.

20. The computing apparatus of claim 15, wherein the authenticating comprises:

transmit, by the account application, the encrypted data to an authentication server, wherein the encrypted data is generated using a diversified key formed from an encryption algorithm and a master key stored in the contactless card; and receive, by the account application from the authentication server, an indication specifying the authentication server decrypted the encrypted data.

* * * * *